US012198663B2

(12) United States Patent
Williams

(10) Patent No.: US 12,198,663 B2
(45) Date of Patent: Jan. 14, 2025

(54) COMPUTER-BASED SYSTEMS, DEVICES, AND METHODS FOR GENERATING AESTHETIC CHORD PROGRESSIONS AND KEY MODULATIONS IN MUSICAL COMPOSITIONS

(71) Applicant: Obeebo Labs Ltd., Waterloo (CA)

(72) Inventor: Colin P. Williams, Half Moon Bay, CA (US)

(73) Assignee: Obeebo Labs Ltd., Waterloo (CA)

( * ) Notice: Subject to any disclaimer, the term of this patent is extended or adjusted under 35 U.S.C. 154(b) by 830 days.

(21) Appl. No.: 17/361,414

(22) Filed: Jun. 29, 2021

(65) Prior Publication Data

US 2021/0407477 A1 Dec. 30, 2021

Related U.S. Application Data

(60) Provisional application No. 63/045,780, filed on Jun. 29, 2020.

(51) Int. Cl.
*G10H 1/36* (2006.01)
*G10H 1/00* (2006.01)

(52) U.S. Cl.
CPC ........... *G10H 1/368* (2013.01); *G10H 1/0025* (2013.01); *G10H 2210/021* (2013.01); *G10H 2210/081* (2013.01); *G10H 2210/105* (2013.01); *G10H 2210/111* (2013.01); *G10H 2210/145* (2013.01); *G10H 2210/571* (2013.01); *G10H 2240/205* (2013.01)

(58) Field of Classification Search
CPC ................. G10H 1/368; G10H 1/0025; G10H 2210/021; G10H 2210/081; G10H 2210/105; G10H 2210/111; G10H 2210/145; G10H 2210/571; G10H 2240/205
See application file for complete search history.

(56) References Cited

U.S. PATENT DOCUMENTS

| | | | | |
|---|---|---|---|---|
| 10,147,407 | B2 * | 12/2018 | Summers | G10H 1/0008 |
| 10,446,126 | B1 * | 10/2019 | Kaye | G10H 1/20 |
| 2019/0378482 | A1 * | 12/2019 | Reinhold et al. | G10H 1/0066 |
| 2022/0122572 | A1 * | 4/2022 | Beasley | G10H 1/38 |

* cited by examiner

*Primary Examiner* — Jianchun Qin
(74) *Attorney, Agent, or Firm* — Thomas Mahon

(57) ABSTRACT

Computer-based systems, devices, and methods for automatically generating aesthetic chord progressions and key modulations in musical compositions are described. Known harmonic relationships are expanded upon to produce a much richer set of harmonic transition probability models compared to conventional music theory, and these models are leveraged by a computer-based musical composition system to generate new musical compositions and variations of existing musical compositions. Techniques for enabling a computer-based musical composition system to automatically determine when to introduce a key modulation, what key to module to, and what chord progression(s) to use within the new key are all described.

4 Claims, 6 Drawing Sheets

100

200

COMPUTER-BASED SYSTEMS, DEVICES, AND METHODS FOR GENERATING AESTHETIC CHORD PROGRESSIONS AND KEY MODULATIONS IN MUSICAL COMPOSITIONS

TECHNICAL FIELD

The present systems, devices, and methods generally relate to computer-generated music, and particularly relate to algorithms for enabling a computer system to generate aesthetic chord progressions and key modulations.

BACKGROUND

Description of the Related Art

Composing Musical Compositions

A musical composition may be characterized by sequences of sequential, simultaneous, and/or overlapping notes that are partitioned into one or more tracks. Starting with an original musical composition, a new musical composition or "variation" can be composed by manipulating the "elements" (e.g., notes, bars, tracks, arrangement, etc.) of the original composition. As examples, different notes may be played at the original times, the original notes may be played at different times, and/or different notes may be played at different times. Further refinements can be made based on many other factors, such as changes in musical key and scale, different choices of chords, different choices of instruments, different orchestration, changes in tempo, the imposition of various audio effects, changes to the sound levels in the mix, and so on.

In order to compose a new musical composition (or variation) based on an original or previous musical composition, it is typically helpful to have a clear characterization of the elements of the original musical composition. In addition to notes, bars, tracks, and arrangements, "segments" are also important elements of a musical composition. In this context, the term "segment" (or "musical segment") is used to refer to a particular sequence of bars (i.e., a subset of serially-adjacent bars) that represents or corresponds to a particular section or portion of a musical composition. A musical segment may include, for example, an intro, a verse, a pre-chorus, a chorus, a bridge, a middle8, a solo, or an outro. The section or portion of a musical composition that corresponds to a "segment" may be defined, for example, by strict rules of musical theory and/or based on the sound or theme of the musical composition.

Musical Notation

Musical notation broadly refers to any application of inscribed symbols to visually represent the composition of a piece of music. The symbols provide a way of "writing down" a song so that, for example, it can be expressed and stored by a composer and later read and performed by a musician. While many different systems of musical notation have been developed throughout history, the most common form used today is sheet music.

Sheet music employs a particular set of symbols to represent a musical composition in terms of the concepts of modern musical theory. Concepts like: pitch, rhythm, tempo, chord, key, dynamics, meter, articulation, ornamentation, and many more, are all expressible in sheet music. Such concepts are so widely used in the art today that sheet music has become an almost universal language in which musicians communicate.

Digital Audio File Formats

While it is common for human musicians to communicate musical compositions in the form of sheet music, it is notably uncommon for computers to do so. Computers typically store and communicate music in well-established digital audio file formats, such as .mid, .wav, or .mp3 (just to name a few), that are designed to facilitate communication between electronic instruments and other devices by allowing for the efficient movement of musical waveforms over computer networks. In a digital audio file format, audio data is typically encoded in one of various audio coding formats (which may be compressed or uncompressed) and either provided as a raw bitstream or, more commonly, embedded in a container or wrapper format.

BRIEF SUMMARY

A computer-implemented method of generating a key modulation in a musical composition may be summarized as including: determining, by a computer-based musical composition system, when to change to a new key; determining, by the computer-based musical composition system, what new key to change to; and determining, by the computer-based musical composition system, what chords to use while within the new key.

The method may further include: storing, in a non-transitory processor-readable storage medium of the computer-based musical composition system, a library of pivot chord relationships between different keys. In this case, determining, by the computer-based musical composition system, what new key to change to may include: identifying a current key; and for a particular chord in the current key: retrieving, from the library of pivot chord relationships, a set of pivot chord relationships that correspond to the particular chord; and selecting, from the set of pivot chord relationships that correspond to the particular chord, a new chord to progress to from the current chord, the new chord being in a new key that is different from the current key. Storing, in a non-transitory processor-readable storage medium of the computer-based musical composition system, a library of pivot chord relationships between different keys may include storing, in the non-transitory processor-readable storage medium of the computer-based musical composition system, a library of pivot chord relationships between different keys of Western music and non-Western music altogether.

The method may further include: storing, in a non-transitory processor-readable storage medium of the computer-based musical composition system, a library of keys that includes a respective set of chords for each key. In this case, determining, by the computer-based musical composition system, what new key to change to may include: identifying a current key; terminating a chord progression in the current key at a particular chord that is diatonic to the current key; retrieving, from the library of keys, a set of candidate keys that include the particular chord; and selecting, from the set of candidate keys, a new chord to progress to from the particular chord, the new chord being in a new key that is different from the current key.

The method may further include: storing, in a non-transitory processor-readable storage medium of the computer-based musical composition system, a representation of a graph comprising nodes and edges that provide pairwise connections between nodes, wherein each node of the graph corresponds to a respective key and each edge of the graph corresponds to a respective transition between a respective pair of keys. In this case, determining, by the computer-based musical composition system, what new key to change to may include identifying a first node in the graph that corresponds to a current key and selecting a new key corresponding to a second node in the graph that is connected to the first node. Storing, in a non-transitory processor-readable storage medium, a representation of a graph may include storing, in the non-transitory processor-readable storage medium, at least one feature selected from a group consisting of: a directionality for at least one edge of the graph, and a weighting for at least one edge of the graph.

Determining, by a computer-based musical composition system, when to change to a new key may include decomposing, by the computer-based musical composition system, a musical composition into a sequence of data structures representing bars of the musical composition and applying a key change in between two adjacent bars of the musical composition.

Determining, by a computer-based musical composition system, when to change to a new key may include determining, by the computer-based musical composition system, transitions in the harmonic structure throughout a musical composition and applying a key change at a transition in the harmonic structure the musical composition.

Determining, by a computer-based musical composition system, when to change to a new key may include partitioning, by the computer-based musical composition system, a musical composition into a sequence of musically coherent segments and applying a key change at a boundary in between two adjacent segments the musical composition. Partitioning, by the computer-based musical composition system, a musical composition into a sequence of musically coherent segments and applying a key change at a boundary in between two adjacent segments the musical composition may include: segmenting, by the computer-based musical composition system, the musical composition into segments; performing, by the computer-based musical composition system, an automated clustering of the segments to group segments that are similar together; and solving, by the computer-based musical composition system, a constraint satisfaction problem that specifies that: every segment is assigned a key; segments in a same cluster are assigned a same key; and segments that abut one another are assigned respective keys that conform to an allowed key to key transition with respect to a key progression generation model.

A computer-implemented method of determining when within a musical composition to transition to a new musical key may be summarized as including: segmenting, by a computer-based musical composition system, the musical composition into segments; performing, by the computer-based musical composition system, an automated clustering of the segments to group segments that are similar together; and solving, by the computer-based musical composition system, a constraint satisfaction problem that specifies that: every segment is assigned a key; segments in a same cluster are assigned a same key; and segments that abut one another are assigned respective keys that conform to an allowed key to key transition with respect to a key progression generation model.

Solving, by the computer-based musical composition system, a constraint satisfaction problem that specifies that segments that abut one another are assigned respective keys that conform to an allowed key to key transition with respect to a key progression generation model may include solving, by the computer-based musical composition system, a constraint satisfaction problem that specifies that segments that abut one another are assigned respective keys that are edge-connected in a representation of a graph wherein each node of the graph corresponds to a respective key and each edge of the graph corresponds to a respective transition between a respective pair of keys.

Solving, by the computer-based musical composition system, a constraint satisfaction problem that specifies that segments that abut one another are assigned respective keys that conform to an allowed key to key transition with respect to a key progression generation model may include solving, by the computer-based musical composition system, a constraint satisfaction problem that specifies that segments that abut one another are assigned respective keys that share a pivot chord relationship.

Solving, by the computer-based musical composition system, a constraint satisfaction problem that specifies that segments that abut one another are assigned respective keys that conform to an allowed key to key transition with respect to a key progression generation model may include solving, by the computer-based musical composition system, a constraint satisfaction problem that specifies that segments that abut one another are assigned respective keys that share a common chord.

A computer-based musical composition system may be summarized as including: at least one processor; and a non-transitory processor-readable storage medium communicatively coupled to the at least one processor, wherein the non-transitory processor-readable storage medium stores data and/or processor-executable instructions that, when executed by the at least one processor, cause the computer-based musical composition system to: determine when to change to a new key; determine what new key to change to; and determine what chords to use while within the new key.

The non-transitory processor-readable storage medium may further store a library of pivot chord relationships between different keys. In this case, the data and/or processor-executable instructions that, when executed by the at least one processor, cause the computer-based musical composition system to determine what new key to change to, may cause the computer-based musical composition system to: identify a current key; and for a particular chord in the current key: retrieve, from the library of pivot chord relationships, a set of pivot chord relationships that correspond to the particular chord; and select, from the set of pivot chord relationships that correspond to the particular chord, a new chord to progress to from the current chord, the new chord being in a new key that is different from the current key.

The non-transitory processor-readable storage medium may further store a library of keys that includes a respective set of chords for each key. In this case, the data and/or processor-executable instructions that, when executed by the at least one processor, cause the computer-based musical composition system to determine what new key to change to, may cause the computer-based musical composition system to: identify a current key; terminate a chord progression in the current key at a particular chord that is diatonic to the current key; retrieve, from the library of keys, a set of candidate keys that include the particular chord; and select, from the set of candidate keys, a new chord to progress to from the particular chord, the new chord being in a new key that is different from the current key.

The non-transitory processor-readable storage medium may further store a representation of a graph comprising nodes and edges that provide pairwise connections between nodes, wherein each node of the graph corresponds to a respective key and each edge of the graph corresponds to a respective transition between a respective pair of keys. In this case, the data and/or processor-executable instructions that, when executed by the at least one processor, cause the computer-based musical composition system to determine what new key to change to, may cause the computer-based musical composition system to: identify a first node in the graph that corresponds to a current key; and select a new key corresponding to a second node in the graph that is connected to the first node.

The data and/or processor-executable instructions that, when executed by the at least one processor, cause the computer-based musical composition system to determine when to change to a new key, may cause the computer-based musical composition system to: partition a musical composition into a sequence of musically coherent segments; and apply a key change at a boundary in between two adjacent segments the musical composition. The data and/or processor-executable instructions that, when executed by the at least one processor, cause the computer-based musical composition system to: partition a musical composition into a sequence of musically coherent segments; and apply a key change at a boundary in between two adjacent segments the musical composition, may cause the computer-based musical composition system to: segment the musical composition into segments; perform an automated clustering of the segments to group segments that are similar together; and solve a constraint satisfaction problem that specifies that: every segment is assigned a key; segments in a same cluster are assigned a same key; and segments that abut one another are assigned respective keys that conform to an allowed key to key transition with respect to a key progression generation model.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
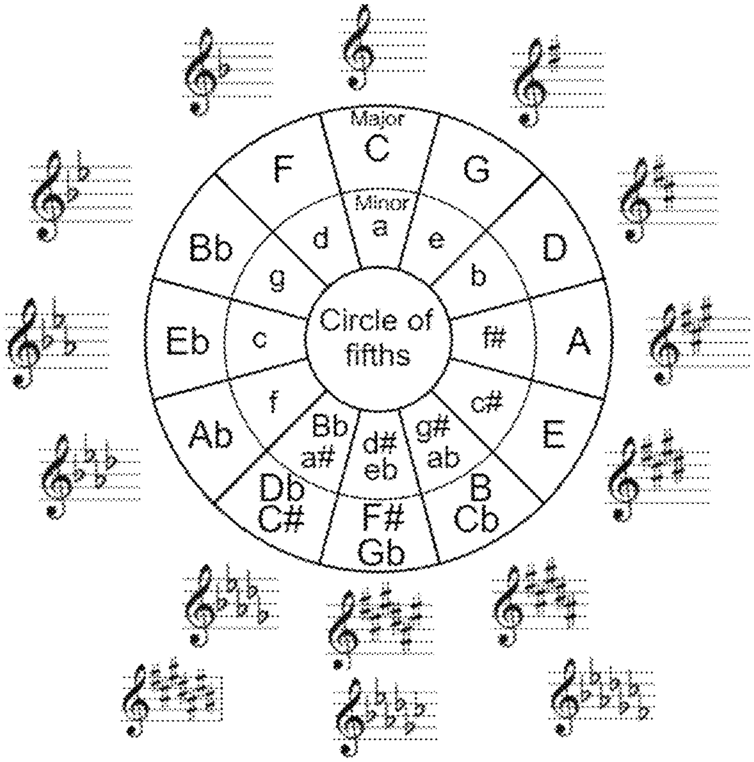
PRIOR ART FIGURE 1
FIG. 1 is an illustrative diagram showing the well-known Circle of Fifths.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide systems, devices, and methods for computer-based generation of aesthetic chord progressions and key modulations in, for example, computer-generated musical compositions. Throughout this specification and the appended claims, a musical variation is considered a form of musical composition and the term "musical composition" (as in, for example, "computer-generated musical composition" and "computer-based musical composition system") is used to include musical variations.

Systems, devices, and methods for encoding musical compositions in hierarchical data structures of the form Music[Segments{ }, barsPerSegment{ }] are described in U.S. Pat. No. 10,629,176, filed Jun. 21, 2019 and entitled "Systems, Devices, and Methods for Digital Representations of Music" (hereinafter "Hum Patent"), which is incorporated by reference herein in its entirety.

Systems, devices, and methods for automatically identifying the musical segments of a musical composition and which can facilitate encoding musical compositions (or even simply undifferentiated sequences of musical bars) into the Music[Segments{ }, barsPerSegment{ }] form described above are described in U.S. Pat. No. 11,024,274, filed Jan. 28, 2020 and entitled "Systems, Devices, and Methods for Segmenting a Musical Composition into Musical Segments" (hereinafter "Segmentation Patent"), which is incorporated herein by reference in its entirety.

Systems, devices, and methods for identifying harmonic structure in digital data structures and for mapping the Music[Segments{ }, barsPerSegment{ }] data structure into an isomorphic HarmonicStructure[Segments{ }, harmonicSequencePerSegment{ }] data structure are described in U.S. patent application Ser. No. 16/775,254, filed Jan. 28, 2020 and entitled "Systems, Devices, and Methods for Harmonic Structure in Digital Representations of Music" (hereinafter "Harmony Patent"), which is incorporated herein by reference in its entirety.

The various embodiments described herein include systems, devices, and methods for, among other things, using Music[Segments{ }, barsPerSegment{ }] data structures and HarmonicStructure[Segments{ }, harmonicSequencePerSegment{ }] data structures to create, compose, and/or generate variations of the note sequences within the musical bars (i.e., within the bar data objects encoded in the data structures) and thereby generate: i) new musical compositions that are variations on an original musical composition; and/or ii) new musical compositions that are, for all intents and purposes, original musical compositions.

In music theory, a "key" may be characterized as a pair consisting of (1) a scale (i.e., a sequence of intervals, or number of half-steps, defining the distance between consecutive notes of the scale), and (2) a root note, which specifies the starting note of the scale. Thus, the key of "C major" (abbreviated by convention as "C maj") uses the intervals of the major scale with "C" as the root note. Likewise, the key of "Ab natural minor" (A flat minor, abbreviated by convention as "Ab min") uses the intervals of the natural minor scale with the note Ab as the root note of scale. Other keys can be defined similarly by picking a root note from amongst C, C#, Db, D, D#, Eb, E, F, F#, Gb, G, G#, Ab, A, A#, Bb, B (where # means "sharp" and b means "flat"), and any scale, including a scale other than the major scale or natural minor scale.

A sequence of chords known as the "natural chords" may be formed for any key by selecting tuples of notes based on their positions in a given scale, taking the root note as the first (1st) note. Specifically, the 1st-3rd-5th scale notes may be used to form a first chord, the 2nd-4th-6th scale notes may be used to form a second chord, and so on. Similarly, the natural 7th chords may be formed by taking larger tuples of scale notes, e.g., 1st-3rd-5th-7th, etc.; the natural 9th chords may be formed by taking the 1st-3rd-5th-7th-9th notes; and the natural 11th chords may be formed by taking the 1st-3rd-5th-7th-9th-11th notes of any key. Thus, the natural k-th chords may be established for any key. In the art, such natural k-th chords are typically constructed for the major and natural minor keys; however, in accordance with the present systems, devices, and methods a computer-based musical composition system may be employed to construct the k-th order chords for all possible scales (not just the major and natural minor keys).

Such natural chords typically contain tuples of notes that harmonize well together, whatever scale is used. Sequences of such natural chords, but not necessarily consecutive natural chords in the aforementioned ordering, provide a basis for creating harmonic musical progressions in any given (fixed) key. If a sequence of chords are all chords from the same key, the progression is said to be "diatonic" to that key. However, it is sometimes desirable to have chord progressions that change, or "modulate", keys. The various implementations described herein include methods for synthesizing, via a computer-based musical composition system, aesthetic chord progressions in modulating keys, i.e., chord progressions that span over one or more changes in key during the musical composition.

The various implementations of methods for synthesizing aesthetic chord progressions and aesthetic key modulations described herein generally include, at a high level, the following steps: A) deciding, by an automated computer-based musical composition system, what key to change to; B) deciding, by the automated computer-based musical composition system, when (within the composition) to change key; and C) deciding, by the automated computer-based musical composition system, what chords to use while within the new key (after each change). While some of the basic musical theory employed throughout the present systems, devices, and methods may be known in the art of musical composition, the various implementations described herein extend and adapt known musical theory to enable sophisticated automated computer-based musical composition systems, devices, and methods that are capable of exploring and deploying aesthetic chord progressions and key modulations that are not typically considered are accessed in conventional, human-based musical composition.

For illustrative purposes, the various implementations described herein are described in relation to the standard major and minor keys of Western music; however, in accordance with the present systems, devices, and methods, the various implementations described herein generalize to all possible keys (i.e., all possible scales having all possible root notes).

A) Enabling a Computer-Based Musical Composition System to Decide What Key to Change to In Western music, there are 12 "major" keys:

C maj,
C# maj/Db maj,
D maj,
D# maj/Eb maj,
E maj,
F maj,
F# maj/Gb maj,
G maj,
G# maj/Ab maj,
A maj,
A# maj/Bb maj,
B maj and 12 "natural minor" (a.k.a. just "minor") keys:

C min,
C# min/Db min,
D min,
D# min/Eb min,
E min,
F min,
F# min/Gb min,
G min,
G# min/Ab min,
A min,
A# min/Bb min,
B min Keys denoted with a forward slash (/) are "enharmonic equivalents", i.e., they comprise identical sets of notes albeit with different names.

It is well known in Western music theory that some of the aforementioned music keys are more or less similar to each other. One method for representing this similarity visually is in a diagram called "The Circle of Fifths." FIG. 1 is an illustrative diagram showing the well-known Circle of Fifths 100 in which the 12 major and 12 natural minor music keys are placed along the circumferences of two concentric circles, with the major keys on the outer circle and the minor keys on the inner circle. When proceeding in the counter-clockwise direction, the same diagram is sometimes referred to as the Circle of Fourths.

Pivot Chord Modulation

Proceeding clockwise around Circle of Fifths 100 from the key of C maj at the top, each consecutive key has one additional sharp note relative to the preceding key. Similarly, proceeding counter-clockwise around Circle of Fifths 100 starting from C maj at the top, each consecutive key has one more flat note than the preceding key. Thus, neighboring keys on the Circle of Fifths 100 differ only by a single sharp or flat. This guarantees that the natural chords of one key are related to the natural chords of the neighboring keys. For example, the Roman V (five) chord of one key is necessarily the Roman I (one) chord of the next key in a clockwise direction. Such chords can serve as "pivot chords" allowing one key to modulate smoothly into a neighboring key. For example, consider the chords of C maj:

I. Chord["C", "maj", {1, 3, 5}, {"C4", "E4", "G4"}],
II. Chord["D", "min", {1, b3, 5}, {"D4", "F4", "A4"}],
III. Chord["E", "min", {1, b3, 5}, {"E4", "G4", "B4"}],
IV. Chord["F", "maj", {1, 3, 5}, {"F4", "A4", "C5"}],
V. Chord["G", "maj", {1, 3, 5}, {"G4", "B4", "D5"}],
VI. Chord["A", "min", {1, b3, 5}, {"A4", "C5", "E5"}],
VII. Chord["B", "dim", {1, b3, b5}, {"B4", "D5", "F5"}]

And compare the chords of C maj to those of G maj (which is the next neighboring chord on the Circle of Fifths 100):

I. Chord["G", "maj", {1, 3, 5}, {"G4", "B4", "D5"}],
II. Chord["A", "min", {1, b3, 5}, {"A4", "C5", "E5"}],
III. Chord["B", "min", {1, b3, 5}, {"B4", "D5", "F#5"}],
IV. Chord["C", "maj", {1, 3, 5}, {"C5", "E5", "G5"}],
V. Chord["D", "maj", {1, 3, 5}, {"D5", "F#5", "A5"}],
VI. Chord["E", "min", {1, b3, 5}, {"E5", "G5", "B5"}],
VII. Chord["F#", "dim", {1, b3, b5}, {"F#5", "A5", "C6"}]

Comparing the above, the Roman V (five) chord, G, of the key of C maj is the same as the Roman I (one) chord, G, of the key of G maj. Thus, to modulate from the key of C maj to the key of G maj a progression that is diatonic to the key of C maj may end in the chord, G, and thereafter proceed to a chord progression in the key of G maj, and such a transition would be smooth. Likewise, as the chord A min is common to both the key of C maj (VI chord) and the key of G maj (II chord), a chord progression diatonic to the key of C maj may be terminated in the chord A min and thereafter a chord progression that is diatonic to the key of G maj may be followed. Thus, an exemplary method for modulating between two keys is to use a pivot chord, where a chord progression of a first key is terminated in a chord that is also a chord of a neighboring key according to some framework, such as for example the Circle of Fifths 100.

Generalizing further, sticking with the key of C maj as an exemplary starting key for illustrative purposes, certain keys in the Circle of Fifths 100 may be skipped over to allow progressions between non-nearest neighbor keys again by using pivot chords. Specifically, consider the chords of D maj:

I. Chord["D", "maj", {1, 3, 5}, {"D4", "F#4", "A4"}],
II. Chord["E", "min", {1, b3, 5}, {"E4", "G4", "B4"}],
III. Chord["F#", "min", {1, b3, 5}, {"F#4", "A4", "C#5"}],
IV. Chord["G", "maj", {1, 3, 5}, {"G4", "B4", "D5"}],
V. Chord["A", "maj", {1, 3, 5}, {"A4", "C#5", "E5"}],
VI. Chord["B", "min", {1, b3, 5}, {"B4", "D5", "F#5"}],
VII. Chord["C#", "dim", {1, b3, b5}, {"C#5", "E5", "G5"}]}

The chords of E min (II chord in D maj) and G (IV chord in D maj) are common to both the key of C maj and the key of D maj. Hence, a progression in C maj may be terminated in either E min or G and thereafter a progression in the key of D maj may be followed. Thus, another exemplary method for modulating between two keys is to use a pivot chord, where a chord progression of a first key is terminated in a chord that is also a chord of a non-neighboring key according to some framework, such as the Circle of Fifths 100.

While such pivot chord relationships are generally known between the major and minor scales of Western music, the present systems, devices, and methods generalize these ideas to enable computer-based musical compositions to deploy all possible keys, i.e., all possible scales having all possible notes as a root note, including in frameworks other than Western music (i.e., "non-Western music"), such as in Japanese music. Such generalization may be too voluminous and unwieldy to be implemented by real human composers, but in accordance with the present systems, devices, and methods a computer-based musical composition system may readily store the pivot chord relationships between all possible keys (e.g., as a look-up table) and rapidly access an appropriate pivot chord to effect a key modulation in a chord progression. Thus, in some implementations determining, by a computer-based musical composition system, what new key to change to may include identifying, by the computer-based musical composition system, that a chord is a possible pivot chord and/or that a pair of chords share a picot chord relationship according to a stored set of pivot chord relationships. This results in computer-generated musical compositions that are distinct from human-generated musical compositions and unlocks realms of musicality not previously explored by conventional music theory.

Furthermore, while the illustrative examples above generally employ triad chords consisting of three notes, the present systems, devices, and methods may be applied using chords having any number of notes, such as chords having two notes, four notes, five notes, six notes, and so on.

Specifically, to illustrate the expansiveness described above, an exemplary list of some possible pivot chords that may be used to pivot from the key of C maj to many possible other keys is provided below. A person of skill in the art will appreciate, based on the present disclosure, that the various implementations described herein also extend beyond the C maj example below to include equivalent sets of pivot chords from every possible key to every other possible key for which pivot chords exist and/or may similarly be constructed, stored in the non-transitory processor-readable storage medium of a computer-based musical composition system, and accessed by the processor of the computer-based musical composition system to effect a key modulation.

```
{{"C_Major -> C_AeolianMajor", {Chord["C",
    "maj", {1, 3, 5}, {"C4", "E4",
      "G4"}]}}, {"C_Major -> C_Algerian", {Chord["B",
    "dim", {1, b3, b5}, {"B4", "D5", "F5"}],
  Chord["G",
    "maj", {1, 3, 5}, {"G4", "B4",
      "D5"}]}}, {"C_Major -> C_Blues4", {Chord["C",
    "maj", {1, 3, 5}, {"C4", "E4",
      "G4"}]}}, {"C_Major -> C_DominantBebop", {Chord["B",
    "dim", {1, b3, b5}, {"B4", "D5", "F5"}],
  Chord["C", "maj", {1, 3, 5}, {"C4", "E4", "G4"}],
  Chord["D",
    "min", {1, b3, 5}, {"D4", "F4",
      "A4"}]}}, {"C_Major -> C_Dorian", {Chord["D",
    "min", {1, b3, 5}, {"D4", "F4", "A4"}],
  Chord["F",
    "maj", {1, 3, 5}, {"F4", "A4",
      "C5"}]}}, {"C_Major -> C_DorianBebop", {Chord["F",
    "maj", {1, 3, 5}, {"F4", "A4",
      "C5"}]}}, {"C_Major -> C_Dorianb5", {Chord["D",
    "min", {1, b3, 5}, {"D4", "F4", "A4"}],
  Chord["F",
    "maj", {1, 3, 5}, {"F4", "A4",
```

-continued

```
    “C5”}]}}, {“C_Major -> C_DoubleHarmonicMajor”, {Chord[“C”,
  “maj”, {1, 3, 5}, {“C4”, “E4”, “G4”}],
Chord[“E”,
  “min”, {1, b3, 5}, {“E4”, “G4”,
    “B4”}]}}, {“C_Major -> C_DoubleHarmonicMinor”, {Chord[“G”,
  “maj”, {1, 3, 5}, {“G4”, “B4”,
    “D5”}]}}, {“C_Major -> C_HarmonicMajor”, {Chord[“B”,
  “dim”, {1, b3, b5}, {“B4”, “D5”, “F5”}],
Chord[“C”, “maj”, {1, 3, 5}, {“C4”, “E4”, “G4”}],
Chord[“E”, “min”, {1, b3, 5}, {“E4”, “G4”, “B4”}],
Chord[“G”,
  “maj”, {1, 3, 5}, {“G4”, “B4”,
    “D5”}]}}, {“C_Major -> C_HarmonicMinor”, {Chord[“B”,
  “dim”, {1, b3, b5}, {“B4”, “D5”, “F5”}],
Chord[“G”,
  “maj”, {1, 3, 5}, {“G4”, “B4”,
    “D5”}]}}, {“C_Major -> C_HarmonicMinorBebop”, {Chord[“B”,
  “dim”, {1, b3, b5}, {“B4”, “D5”,
    “F5”}]}}, {“C_Major -> C_Hawaiian”, {Chord[“G”,
  “maj”, {1, 3, 5}, {“G4”, “B4”,
    “D5”}]}}, {“C_Major -> C_Hindu”, {Chord[“C”,
  “maj”, {1, 3, 5}, {“C4”, “E4”,
    “G4”}]}}, {“C_Major -> C_HungarianMajor1”, {Chord[“A”,
  “min”, {1, b3, 5}, {“A4”, “C5”, “E5”}],
Chord[“C”,
  “maj”, {1, 3, 5}, {“C4”, “E4”,
    “G4”}]}}, {“C_Major -> C_HungarianMajor2”, {Chord[“A”,
  “min”, {1, b3, 5}, {“A4”, “C5”, “E5”}],
Chord[“C”,
  “maj”, {1, 3, 5}, {“C4”, “E4”,
    “G4”}]}}, {“C_Major -> C_HungarianMinor2”, {Chord[“G”,
  “maj”, {1, 3, 5}, {“G4”, “B4”,
    “D5”}]}}, {“C_Major -> C_Ionian”, {Chord[“A”,
  “min”, {1, b3, 5}, {“A4”, “C5”, “E5”}],
Chord[“B”, “dim”, {1, b3, b5}, {“B4”, “D5”, “F5”}],
Chord[“C”, “maj”, {1, 3, 5}, {“C4”, “E4”, “G4”}],
Chord[“D”, “min”, {1, b3, 5}, {“D4”, “F4”, “A4”}],
Chord[“E”, “min”, {1, b3, 5}, {“E4”, “G4”, “B4”}],
Chord[“F”, “maj”, {1, 3, 5}, {“F4”, “A4”, “C5”}],
Chord [“G”,
  “maj”, {1, 3, 5}, {“G4”, “B4”,
    “D5”}]}}, {“C_Major -> C_Ionianb6”, {Chord[“B”,
  “dim”, {1, b3, b5}, {“B4”, “D5”, “F5”}],
Chord[“C”, “maj”, {1, 3, 5}, {“C4”, “E4”, “G4”}],
Chord[“E”, “min”, {1, b3, 5}, {“E4”, “G4”, “B4”}],
Chord[“G”,
  “maj”, {1, 3, 5}, {“G4”, “B4”,
    “D5”}]}}, {“C_Major -> C_Locrian\[Natural]6”, {Chord[“F”,
  “maj”, {1, 3, 5}, {“F4”, “A4”,
    “C5”}]}}, {“C_Major -> C_Lydian”, {Chord[“A”,
  “min”, {1, b3, 5}, {“A4”, “C5”, “E5”}],
Chord[“C”, “maj”, {1, 3, 5}, {“C4”, “E4”, “G4”}],
Chord[“E”, “min”, {1, b3, 5}, {“E4”, “G4”, “B4”}],
Chord[“G”,
  “maj”, {1, 3, 5}, {“G4”, “B4”,
    “D5”}]}}, {“C_Major -> C_LydianAugmented”, {Chord[“A”,
  “min”, {1, b3, 5}, {“A4”, “C5”,
    “E5”}]}}, {“C_Major -> C_LydianAugmented#2”, {Chord[“A”,
  “min”, {1, b3, 5}, {“A4”, “C5”,
    “E5”}]}}, {“C_Major -> C_LydianDominant”, {Chord[“A”,
  “min”, {1, b3, 5}, {“A4”, “C5”, “E5”}],
Chord[“C”,
  “maj”, {1, 3, 5}, {“C4”, “E4”,
    “G4”}]}}, {“C_Major -> C_Lydianb3”, {Chord[“G”,
  “maj”, {1, 3, 5}, {“G4”, “B4”,
    “D5”}]}}, {“C_Major -> C_Lydian#2”, {Chord[“A”,
  “min”, {1, b3, 5}, {“A4”, “C5”, “E5”}],
Chord[“C”, “maj”, {1, 3, 5}, {“C4”, “E4”, “G4”}],
Chord[“E”,
  “min”, {1, b3, 5}, {“E4”, “G4”,
    “B4”}]}}, {“C_Major -> C_MajorAugmented”, {Chord[“A”,
  “min”, {1, b3, 5}, {“A4”, “C5”, “E5”}],
Chord[“B”, “dim”, {1, b3, b5}, {“B4”, “D5”, “F5”}],
Chord[“D”, “min”, {1, b3, 5}, {“D4”, “F4”, “A4”}],
Chord [“F”,
  “maj”, {1, 3, 5}, {“F4”, “A4”,
    “C5”}]}}, {“C_Major -> C_MajorBebop”, {Chord[“A”,
  “min”, {1, b3, 5}, {“A4”, “C5”, “E5”}],
Chord[“B”, “dim”, {1, b3, b5}, {“B4”, “D5”, “F5”}],
```

-continued

```
Chord[“C”,
  “maj”, {1, 3, 5}, {“C4”, “E4”,
    “G4”}]}}, {“C_Major -> C_MelodicMinorAscending”, {Chord
[“B”,
  “dim”, {1, b3, b5}, {“B4”, “D5”, “F5”}],
Chord[“D”, “min”, {1, b3, 5}, {“D4”, “F4”, “A4”}],
Chord[“F”, “maj”, {1, 3, 5}, {“F4”, “A4”, “C5”}],
Chord[“G”,
  “maj”, {1, 3, 5}, {“G4”, “B4”,
    “D5”}]}}, {“C_Major -> C_MelodicMinorBebop”, {Chord[“B”,
  “dim”, {1, b3, b5}, {“B4”, “D5”,
    “F5”}]}}, {“C_Major -> C_MinorBebop”, {Chord[“F”,
  “maj”, {1, 3, 5}, {“F4”, “A4”,
    “C5”}]}}, {“C_Major -> C_MinorBlues2”, {Chord[“C”,
  “maj”, {1, 3, 5}, {“C4”, “E4”,
    “G4”}]}}, {“C_Major -> C_MixoBlues”, {Chord[“G”,
  “maj”, {1, 3, 5}, {“G4”, “B4”,
    “D5”}]}}, {“C_Major -> C_Mixolydian”, {Chord[“A”,
  “min”, {1, b3, 5}, {“A4”, “C5”, “E5”}],
Chord[“C”, “maj”, {1, 3, 5}, {“C4”, “E4”, “G4”}],
Chord[“D”, “min”, {1, b3, 5}, {“D4”, “F4”, “A4”}],
Chord[“F”,
  “maj”, {1, 3, 5}, {“F4”, “A4”,
    “C5”}]}}, {“C_Major -> C_Mixolydianb2”, {Chord[“A”,
  “min”, {1, b3, 5}, {“A4”, “C5”, “E5”}],
Chord[“C”, “maj”, {1, 3, 5}, {“C4”, “E4”, “G4”}],
Chord[“F”,
  “maj”, {1, 3, 5}, {“F4”, “A4”,
    “C5”}]}}, {“C_Major -> C_NeapolitanMajor”, {Chord[“F”,
  “maj”, {1, 3, 5}, {“F4”, “A4”,
    “C5”}]}}, {“C_Major -> C_PhrygianDominant”, {Chord[“C”,
  “maj”, {1, 3, 5}, {“C4”, “E4”,
    “G4”}]}}, {“C_Major -> C_PhrygianDominantBebop”,
    {Chord[“C”,
  “maj”, {1, 3, 5}, {“C4”, “E4”,
    “G4”}]}}, {“C_Major -> C_Phrygian\[Natural]6”, {Chord[“F”,
  “maj”, {1, 3, 5}, {“F4”, “A4”,
    “C5”}]}}, {“C_Major -> C_SpanishGypsy”, {Chord[“C”,
  “maj”, {1, 3, 5}, {“C4”, “E4”,
    “G4”}]}}, {“C_Major -> C_Tritone”, {Chord[“C”,
  “maj”, {1, 3, 5}, {“C4”, “E4”,
    “G4”}]}}, {“C_Major -> C_WholeHalfDiminished”, {Chord[“B”,
  “dim”, {1, b3, b5}, {“B4”, “D5”,
    “F5”}]}}, {“C_Major -> C#_Blues1”, {Chord[“E”,
  “min”, {1, b3, 5}, {“E4”, “G4”,
    “B4”}]}}, {“C_Major -> C#_Blues2”, {Chord[“E”,
  “min”, {1, b3, 5}, {“E4”, “G4”,
    “B4”}]}}, {“C_Major -> C#_Blues3”, {Chord[“E”,
  “min”, {1, b3, 5}, {“E4”, “G4”,
    “B4”}]}}, {“C_Major -> C#_Blues5”, {Chord[“B”,
  “dim”, {1, b3, b5}, {“B4”, “D5”,
    “F5”}]}}, {“C_Major -> C#_DiminishedLocrian”, {Chord[“D”,
  “min”, {1, b3, 5}, {“D4”, “F4”,
    “A4”}]}}, {“C_Major -> C#_Dorianb5”, {Chord[“E”,
  “min”, {1, b3, 5}, {“E4”, “G4”,
    “B4”}]}}, {“C_Major -> C#_Enigmatic1”, {Chord[“F”,
  “maj”, {1, 3, 5}, {“F4”, “A4”,
    “C5”}]}}, {“C_Major -> C#_HalfWholeDiminished”, {Chord[
  “B”, “dim”, {1, b3, b5}, {“B4”, “D5”,
    “F5”}]}}, {“C_Major -> C#_Locrian”, {Chord[“E”,
  “min”, {1, b3, 5}, {“E4”, “G4”, “B4”}],
Chord[“G”,
  “maj”, {1, 3, 5}, {“G4”, “B4”,
    “D5”}]}}, {“C_Major -> C#_Locrian\[Natural]2”, {Chord[“E”,
    “min”, {1, b3, 5}, {“E4”, “G4”,
    “B4”}]}}, {“C_Major -> C#_Locrian\[Natural]6”, {Chord[“E”,
    “min”, {1, b3, 5}, {“E4”, “G4”, “B4”}],
Chord[“G”,
  “maj”, {1, 3, 5}, {“G4”, “B4”,
    “D5”}]}}, {“C_Major -> C#_LydianAugmented”, {Chord[“F”,
  “maj”, {1, 3, 5}, {“F4”, “A4”,
    “C5”}]}}, {“C_Major -> C#_LydianAugmented#2”, \
{Chord[“A”, “min”, {1, b3, 5}, {“A4”, “C5”, “E5”}],
Chord[“F”,
  “maj”, {1, 3, 5}, {“F4”, “A4”,
    “C5”}]}}, {“C_Major -> C#_MajorAugmented”, {Chord[“F”,
  “maj”, {1, 3, 5}, {“F4”, “A4”,
    “C5”}]}}, {“C_Major -> C#_MinorBlues1”, {Chord[“E”,
  “min”, {1, b3, 5}, {“E4”, “G4”,
    “B4”}]}}, {“C_Major -> C#_Phrygianb4”, {Chord[“B”,
```

-continued

```
        "dim", {1, b3, b5}, {"B4", "D5", "F5"}],
    Chord["D",
        "min", {1, b3, 5}, {"D4", "F4",
            "A4"}]}}, {"C_Major -> C#_Spanish8Tone", {Chord["B",
        "dim", {1, b3, b5}, {"B4", "D5", "F5"}],
    Chord["G",
        "maj", {1, 3, 5}, {"G4", "B4",
            "D5"}]}}, {"C_Major -> C#_SuperLocrian", {Chord["B",
        "dim", {1, b3, b5}, {"B4", "D5", "F5"}],
    Chord["D", "min", {1, b3, 5}, {"D4", "F4", "A4"}],
    Chord["E", "min", {1, b3, 5}, {"E4", "G4", "B4"}],
    Chord["G",
        "maj", {1, 3, 5}, {"G4", "B4",
            "D5"}]}}, {"C_Major -> C#_SuperLocrianJazz", {Chord["B",
        "dim", {1, b3, b5}, {"B4", "D5", "F5"}],
    Chord["D", "min", {1, b3, 5}, {"D4", "F4", "A4"}],
    Chord["E", "min", {1, b3, 5}, {"E4", "G4", "B4"}],
    Chord["G",
        "maj", {1, 3, 5}, {"G4", "B4",
            "D5"}]}}, {"C_Major -> C#_Tritone", {Chord["G",
        "maj", {1, 3, 5}, {"G4", "B4",
            "D5"}]}}, {"C_Major -> Db_Blues1", {Chord["E",
        "min", {1, b3, 5}, {"E4", "G4",
            "B4"}]}}, {"C_Major -> Db_Blues2", {Chord["E",
        "min", {1, b3, 5}, {"E4", "G4",
            "B4"}]}}, {"C_Major -> Db_Blues3", {Chord["E",
        "min", {1, b3, 5}, {"E4", "G4",
            "B4"}]}}, {"C_Major -> Db_Blues5", {Chord["B",
        "dim", {1, b3, b5}, {"B4", "D5",
            "F5"}]}}, {"C_Major -> Db_DiminishedLocrian", {Chord["D",
        "min", {1, b3, 5}, {"D4", "F4",
            "A4"}]}}, {"C_Major -> Db_Dorianb5", {Chord["E",
        "min", {1, b3, 5}, {"E4", "G4",
            "B4"}]}}, {"C_Major -> Db_Enigmatic1", {Chord["F",
        "maj", {1, 3, 5}, {"F4", "A4",
            "C5"}]}}, {"C_Major -> Db_HalfWholeDiminished", {Chord["B",
        "dim", {1, b3, b5}, {"B4", "D5",
            "F5"}]}}, {"C_Major -> Db_Locrian", {Chord["E",
        "min", {1, b3, 5}, {"E4", "G4", "B4"}],
    Chord["G",
        "maj", {1, 3, 5}, {"G4", "B4",
            "D5"}]}}, {"C_Major -> Db_Locrian\[Natural]2", {Chord["E",
        "min", {1, b3, 5}, {"E4", "G4",
            "B4"}]}}, {"C_Major -> Db_Locrian\[Natural]6", {Chord["E",
        "min", {1, b3, 5}, {"E4", "G4", "B4"}],
    Chord["G",
        "maj", {1, 3, 5}, {"G4", "B4",
            "D5"}]}}, {"C_Major -> Db_LydianAugmented", {Chord["F",
        "maj", {1, 3, 5}, {"F4", "A4",
            "C5"}]}}, {"C_Major -> Db_LydianAugmented#2", \
{Chord["A", "min", {1, b3, 5}, {"A4", "C5", "E5"}],
    Chord["F",
        "maj", {1, 3, 5}, {"F4", "A4",
            "C5"}]}}, {"C_Major -> Db_MajorAugmented", {Chord["F",
        "maj", {1, 3, 5}, {"F4", "A4",
            "C5"}]}}, {"C_Major -> Db_MinorBlues1", {Chord["E",
        "min", {1, b3, 5}, {"E4", "G4",
            "B4"}]}}, {"C_Major -> Db_Phrygianb4", {Chord["B",
        "dim", {1, b3, b5}, {"B4", "D5", "F5"}],
    Chord["D",
        "min", {1, b3, 5}, {"D4", "F4",
            "A4"}]}}, {"C_Major -> Db_Spanish8Tone", {Chord["B",
        "dim", {1, b3, b5}, {"B4", "D5", "F5"}],
    Chord["G",
        "maj", {1, 3, 5}, {"G4", "B4",
            "D5"}]}}, {"C_Major -> Db_SuperLocrian", {Chord["B",
        "dim", {1, b3, b5}, {"B4", "D5", "F5"}],
    Chord["D", "min", {1, b3, 5}, {"D4", "F4", "A4"}],
    Chord["E", "min", {1, b3, 5}, {"E4", "G4", "B4"}],
    Chord["G",
        "maj", {1, 3, 5}, {"G4", "B4",
            "D5"}]}}, {"C_Major -> Db_SuperLocrianJazz", {Chord["B",
        "dim", {1, b3, b5}, {"B4", "D5", "F5"}],
    Chord["D", "min", {1, b3, 5}, {"D4", "F4", "A4"}],
    Chord["E", "min", {1, b3, 5}, {"E4", "G4", "B4"}],
    Chord["G",
        "maj", {1, 3, 5}, {"G4", "B4",
            "D5"}]}}, {"C_Major -> Db_Tritone", {Chord["G",
        "maj", {1, 3, 5}, {"G4", "B4",
```

-continued

```
            "D5"}]}}, {"C_Major -> D_Aeolian", {Chord["A",
        "min", {1, b3, 5}, {"A4", "C5", "E5"}],
    Chord["D", "min", {1, b3, 5}, {"D4", "F4", "A4"}],
    Chord["F",
        "maj", {1, 3, 5}, {"F4", "A4",
            "C5"}]}}, {"C_Major -> D_AeolianMajor", {Chord["A",
        "min", {1, b3, 5}, {"A4", "C5",
            "E5"}]}}, {"C_Major -> D_Augmented2", {Chord["F",
        "maj", {1, 3, 5}, {"F4", "A4",
            "C5"}]}}, {"C_Major -> D_Blues5", {Chord["B",
        "dim", {1, b3, b5}, {"B4", "D5",
            "F5"}]}}, {"C_Major -> D_Blues6", {Chord["A",
        "min", {1, b3, 5}, {"A4", "C5", "E5"}],
    Chord["B",
        "dim", {1, b3, b5}, {"B4", "D5",
            "F5"}]}}, {"C_Major -> D_Blues8", {Chord["A",
        "min", {1, b3, 5}, {"A4", "C5", "E5"}],
    Chord["B",
        "dim", {1, b3, b5}, {"B4", "D5",
            "F5"}]}}, {"C_Major -> D_DominantBebop", {Chord["E",
        "min", {1, b3, 5}, {"E4", "G4",
            "B4"}]}}, {"C_Major -> D_Dorian", {Chord["A",
        "min", {1, b3, 5}, {"A4", "C5", "E5"}],
    Chord["B", "dim", {1, b3, b5}, {"B4", "D5", "F5"}],
    Chord["D", "min", {1, b3, 5}, {"D4", "F4", "A4"}],
    Chord["E", "min", {1, b3, 5}, {"E4", "G4", "B4"}],
    Chord["F", "maj", {1, 3, 5}, {"F4", "A4", "C5"}],
    Chord["G",
        "maj", {1, 3, 5}, {"G4", "B4",
            "D5"}]}}, {"C_Major -> D_DorianBebop", {Chord["A",
        "min", {1, b3, 5}, {"A4", "C5", "E5"}],
    Chord["B", "dim", {1, b3, b5}, {"B4", "D5", "F5"}],
    Chord["G",
        "maj", {1, 3, 5}, {"G4", "B4",
            "D5"}]}}, {"C_Major -> D_Dorianb5", {Chord["B",
        "dim", {1, b3, b5}, {"B4", "D5", "F5"}],
    Chord["E", "min", {1, b3, 5}, {"E4", "G4", "B4"}],
    Chord["G",
        "maj", {1, 3, 5}, {"G4", "B4",
            "D5"}]}}, {"C_Major -> D_Dorian#4", {Chord["A",
        "min", {1, b3, 5}, {"A4", "C5", "E5"}],
    Chord["B", "dim", {1, b3, b5}, {"B4", "D5", "F5"}],
    Chord["D", "min", {1, b3, 5}, {"D4", "F4", "A4"}],
    Chord["F",
        "maj", {1, 3, 5}, {"F4", "A4",
            "C5"}]}}, {"C_Major -> D_DoubleHarmonicMinor", {Chord["D",
        "min", {1, b3, 5}, {"D4", "F4",
            "A4"}]}}, {"C_Major -> D_Geez(Ethiopian)", {Chord["A",
        "min", {1, b3, 5}, {"A4", "C5", "E5"}],
    Chord["D", "min", {1, b3, 5}, {"D4", "F4", "A4"}],
    Chord["F",
        "maj", {1, 3, 5}, {"F4", "A4",
            "C5"}]}}, {"C_Major -> D_HalfWholeDiminished", {Chord["B",
        "dim", {1, b3, b5}, {"B4", "D5",
            "F5"}]}}, {"C_Major -> D_HarmonicMinor", {Chord["D",
        "min", {1, b3, 5}, {"D4", "F4",
            "A4"}]}}, {"C_Major -> D_HarmonicMinorBebop", {Chord["D",
        "min", {1, b3, 5}, {"D4", "F4", "A4"}],
    Chord["F",
        "maj", {1, 3, 5}, {"F4", "A4",
            "C5"}]}}, {"C_Major -> D_Hawaiian", {Chord["B",
        "dim", {1, b3, b5}, {"B4", "D5",
            "F5"}]}}, {"C_Major -> D_Hindu", {Chord["A",
        "min", {1, b3, 5}, {"A4", "C5",
            "E5"}]}}, {"C_Major -> D_HungarianMinor1", {Chord["A",
        "min", {1, b3, 5}, {"A4", "C5", "E5"}],
    Chord["D", "min", {1, b3, 5}, {"D4", "F4", "A4"}],
    Chord["F",
        "maj", {1, 3, 5}, {"F4", "A4",
            "C5"}]}}, {"C_Major -> D_HungarianMinor2", {Chord["D",
        "min", {1, b3, 5}, {"D4", "F4",
            "A4"}]}}, {"C_Major -> D_Ionian", {Chord["E",
        "min", {1, b3, 5}, {"E4", "G4", "B4"}],
    Chord["G",
        "maj", {1, 3, 5}, {"G4", "B4",
            "D5"}]}}, {"C_Major -> D_Locrian\[Natural]6", {Chord["B",
        "dim", {1, b3, b5}, {"B4", "D5", "F5"}],
    Chord["G",
        "maj", {1, 3, 5}, {"G4", "B4",
```

-continued

"D5"}]}}, {"C_Major -> D_LydianDominant", {Chord["A", "min", {1, b3, 5}, {"A4", "C5", "E5"}]}}, {"C_Major -> D_Lydianb3", {Chord["B", "dim", {1, b3, b5}, {"B4", "D5", "F5"}], Chord["D", "min", {1, b3, 5}, {"D4", "F4", "A4"}]}}, {"C_Major -> D_MajorAugmented", {Chord["E", "min", {1, b3, 5}, {"E4", "G4", "B4"}], Chord["G", "maj", {1, 3, 5}, {"G4", "B4", "D5"}]}}, {"C_Major -> D_MajorBlues", {Chord["D", "min", {1, b3, 5}, {"D4", "F4", "A4"}]}}, {"C_Major -> D_MelodicMinorAscending", {Chord["B", "dim", {1, b3, b5}, {"B4", "D5", "F5"}], Chord["D", "min", {1, b3, 5}, {"D4", "F4", "A4"}], Chord["E", "min", {1, b3, 5}, {"E4", "G4", "B4"}], Chord["G", "maj", {1, 3, 5}, {"G4", "B4", "D5"}]}}, {"C_Major -> D_MelodicMinorBebop", {Chord["B", "dim", {1, b3, b5}, {"B4", "D5", "F5"}], Chord["D", "min", {1, b3, 5}, {"D4", "F4", "A4"}]}}, {"C_Major -> D_MinorBebop", {Chord["A", "min", {1, b3, 5}, {"A4", "C5", "E5"}], Chord["B", "dim", {1, b3, b5}, {"B4", "D5", "F5"}], Chord["G", "maj", {1, 3, 5}, {"G4", "B4", "D5"}]}}, {"C_Major -> D_MixoBlues", {Chord["B", "dim", {1, b3, b5}, {"B4", "D5", "F5"}]}}, {"C_Major -> D_Mixolydian", {Chord["A", "min", {1, b3, 5}, {"A4", "C5", "E5"}], Chord["E", "min", {1, b3, 5}, {"E4", "G4", "B4"}], Chord["G", "maj", {1, 3, 5}, {"G4", "B4", "D5"}]}}, {"C_Major -> D_Mixolydianb2", {Chord["G", "maj", {1, 3, 5}, {"G4", "B4", "D5"}]}}, {"C_Major -> D_NaturalMinor", {Chord["A", "min", {1, b3, 5}, {"A4", "C5", "E5"}], Chord["D", "min", {1, b3, 5}, {"D4", "F4", "A4"}], Chord["F", "maj", {1, 3, 5}, {"F4", "A4", "C5"}]}}, {"C_Major -> D_NeapolitanMajor", {Chord["B", "dim", {1, b3, b5}, {"B4", "D5", "F5"}], Chord["D", "min", {1, b3, 5}, {"D4", "F4", "A4"}], Chord["G", "maj", {1, 3, 5}, {"G4", "B4", "D5"}]}}, {"C_Major -> D_NeapolitanMinor", {Chord["D", "min", {1, b3, 5}, {"D4", "F4", "A4"}]}}, {"C_Major -> D_NineToneScale", {Chord["B", "dim", {1, b3, b5}, {"B4", "D5", "F5"}]}}, {"C_Major -> D_Phrygian", {Chord["D", "min", {1, b3, 5}, {"D4", "F4", "A4"}], Chord["F", "maj", {1, 3, 5}, {"F4", "A4", "C5"}]}}, {"C_Major -> D_Phrygianb4", {Chord["D", "min", {1, b3, 5}, {"D4", "F4", "A4"}], Chord["F", "maj", {1, 3, 5}, {"F4", "A4", "C5"}]}}, {"C_Major -> D_Phrygian\[Natural]6", {Chord["B", "dim", {1, b3, b5}, {"B4", "D5", "F5"}], Chord["D", "min", {1, b3, 5}, {"D4", "F4", "A4"}], Chord["F", "maj", {1, 3, 5}, {"F4", "A4", "C5"}], Chord["G", "maj", {1, 3, 5}, {"G4", "B4", "D5"}]}}, {"C_Major -> D_RomanianMinor", {Chord["A", "min", {1, b3, 5}, {"A4", "C5", "E5"}], Chord["B", "dim", {1, b3, b5}, {"B4", "D5", "F5"}], Chord["D", "min", {1, b3, 5}, {"D4", "F4", "A4"}], Chord["F", "maj", {1, 3, 5}, {"F4", "A4", "C5"}]}}, {"C_Major -> D_WholeHalfDiminished", {Chord["B", "dim", {1, b3, b5}, {"B4", "D5", "F5"}]}}, {"C_Major -> D#_DiminishedLocrian", {Chord["A", "min", {1, b3, 5}, {"A4", "C5", "E5"}], Chord["E", "min", {1, b3, 5}, {"E4", "G4", "B4"}]}}, {"C_Major -> D#_Dorian#4", {Chord["F", "maj", {1, 3, 5}, {"F4", "A4", "C5"}]}}, {"C_Major -> D#_Enigmatic1", {Chord["G", "maj", {1, 3, 5}, {"G4", "B4", "D5"}]}}, {"C_Major -> D#_HarmonicMinorBebop", {Chord["B", "dim", {1, b3, b5}, {"B4", "D5", "F5"}]}}, {"C_Major -> D#_Locrianbb7", {Chord[ "A", "min", {1, b3, 5}, {"A4", "C5", "E5"}]}}, {"C_Major -> D#_Lydian", {Chord["F", "maj", {1, 3, 5}, {"F4", "A4", "C5"}]}}, {"C_Major -> D#_LydianAugmented", {Chord["B", "dim", {1, b3, b5}, {"B4", "D5", "F5"}], Chord["F", "maj", {1, 3, 5}, {"F4", "A4", "C5"}], Chord["G", "maj", {1, 3, 5}, {"G4", "B4", "D5"}]}}, {"C_Major -> D#_LydianAugmented#2", \ {Chord["G", "maj", {1, 3, 5}, {"G4", "B4", "D5"}]}}, {"C_Major -> D#_LydianDominant", {Chord["F", "maj", {1, 3, 5}, {"F4", "A4", "C5"}]}}, {"C_Major -> D#_Lydianb3", {Chord["F", "maj", {1, 3, 5}, {"F4", "A4", "C5"}]}}, {"C_Major -> D#_MajorAugmented", {Chord["B", "dim", {1, b3, b5}, {"B4", "D5", "F5"}], Chord["G", "maj", {1, 3, 5}, {"G4", "B4", "D5"}]}}, {"C_Major -> D#_MajorBebop", {Chord["B", "dim", {1, b3, b5}, {"B4", "D5", "F5"}]}}, {"C_Major -> D#_MelodicMinorBebop", {Chord["B", "dim", {1, b3, b5}, {"B4", "D5", "F5"}]}}, {"C_Major -> D#_NineToneScale", {Chord["B", "dim", {1, b3, b5}, {"B4", "D5", "F5"}]}}, {"C_Major -> D#_Phrygianb4", {Chord["E", "min", {1, b3, 5}, {"E4", "G4", "B4"}]}}, {"C_Major -> D#_RomanianMinor", {Chord["F", "maj", {1, 3, 5}, {"F4", "A4", "C5"}]}}, {"C_Major -> D#_SuperLocrian", {Chord["E", "min", {1, b3, 5}, {"E4", "G4", "B4"}]}}, {"C_Major -> D#_SuperLocrianJazz", {Chord["E", "min", {1, b3, 5}, {"E4", "G4", "B4"}]}}, {"C_Major -> D#_WholeHalfDiminished", {Chord[ "B", "dim", {1, b3, b5}, {"B4", "D5", "F5"}]}}, {"C_Major -> Eb_DiminishedLocrian", {Chord["A", "min", {1, b3, 5}, {"A4", "C5", "E5"}], Chord["E", "min", {1, b3, 5}, {"E4", "G4", "B4"}]}}, {"C_Major -> Eb_Dorian#4", {Chord["F", "maj", {1, 3, 5}, {"F4", "A4", "C5"}]}}, {"C_Major -> Eb_Enigmatic1", {Chord["G", "maj", {1, 3, 5}, {"G4", "B4", "D5"}]}}, {"C_Major -> Eb_HarmonicMinorBebop", {Chord["B", "dim", {1, b3, b5}, {"B4", "D5", "F5"}]}}, {"C_Major -> Eb_Locrianbb7", {Chord[ "A", "min", {1, b3, 5}, {"A4", "C5", "E5"}]}}, {"C_Major -> Eb_Lydian", {Chord["F", "maj", {1, 3, 5}, {"F4", "A4", "C5"}]}}, {"C_Major -> Eb_LydianAugmented", {Chord["B", "dim", {1, b3, b5}, {"B4", "D5", "F5"}], Chord["F", "maj", {1, 3, 5}, {"F4", "A4", "C5"}], Chord["G", "maj", {1, 3, 5}, {"G4", "B4", "D5"}]}}, {"C_Major -> Eb_LydianAugmented#2", \ {Chord["G", "maj", {1, 3, 5}, {"G4", "B4", "D5"}]}}, {"C_Major -> Eb_LydianDominant", {Chord["F", "maj", {1, 3, 5}, {"F4", "A4", "C5"}]}}, {"C_Major -> Eb_Lydianb3", {Chord["F", "maj", {1, 3, 5}, {"F4", "A4", "C5"}]}}, {"C_Major -> Eb_MajorAugmented", {Chord["B", "dim", {1, b3, b5}, {"B4", "D5", "F5"}], Chord["G", "maj", {1, 3, 5}, {"G4", "B4", "D5"}]}}, {"C_Major -> Eb_MajorBebop", {Chord["B", "dim", {1, b3, b5}, {"B4", "D5", "F5"}]}}, {"C_Major -> Eb_MelodicMinorBebop", {Chord["B", "dim", {1, b3, b5}, {"B4", "D5", "F5"}]}}, {"C_Major -> Eb_NineToneScale", {Chord["B", "dim", {1, b3, b5}, {"B4", "D5", "F5"}]}}, {"C_Major -> Eb_Phrygianb4", {Chord["E", "min", {1, b3, 5}, {"E4", "G4", "B4"}]}}, {"C_Major -> Eb_RomanianMinor", {Chord["F", -continued "maj", {1, 3, 5}, {"F4", "A4",
"C5"}]}}, {"C_Major -> Eb_SuperLocrian", {Chord["E",
"min", {1, b3, 5}, {"E4", "G4",
"B4"}]}}, {"C_Major -> Eb_SuperLocrianJazz", {Chord["E",
"min", {1, b3, 5}, {"E4", "G4",
"B4"}]}}, {"C_Major -> Eb_WholeHalfDiminished", {Chord["B",
"dim", {1, b3, b5}, {"B4", "D5",
"F5"}]}}, {"C_Major -> E_Aeolian", {Chord["A",
"min", {1, b3, 5}, {"A4", "C5", "E5"}],
Chord["E", "min", {1, b3, 5}, {"E4", "G4", "B4"}],
Chord["G",
"maj", {1, 3, 5}, {"G4", "B4",
"D5"}]}}, {"C_Major -> E_AeolianMajor", {Chord["A",
"min", {1, b3, 5}, {"A4", "C5",
"E5"}]}}, {"C_Major -> E_Arabic", {Chord["A",
"min", {1, b3, 5}, {"A4", "C5",
"E5"}]}}, {"C_Major -> E_Augmented2", {Chord["G",
"maj", {1, 3, 5}, {"G4", "B4",
"D5"}]}}, {"C_Major -> E_Blues4", {Chord["A",
"min", {1, b3, 5}, {"A4", "C5",
"E5"}]}}, {"C_Major -> E_Blues5", {Chord["B",
"dim", {1, b3, b5}, {"B4", "D5",
"F5"}]}}, {"C_Major -> E_Byzantine", {Chord["A",
"min", {1, b3, 5}, {"A4", "C5",
"E5"}]}}, {"C_Major -> E_Dorian", {Chord["E",
"min", {1, b3, 5}, {"E4", "G4", "B4"}],
Chord["G",
"maj", {1, 3, 5}, {"G4", "B4",
"D5"}]}}, {"C_Major -> E_Dorian#4", {Chord["E",
"min", {1, b3, 5}, {"E4", "G4", "B4"}],
Chord["G",
"maj", {1, 3, 5}, {"G4", "B4",
"D5"}]}}, {"C_Major -> E_DoubleHarmonicMajor", {Chord["A",
"min", {1, b3, 5}, {"A4", "C5", "E5"}],
Chord["F",
"maj", {1, 3, 5}, {"F4", "A4",
"C5"}]}}, {"C_Major -> E_DoubleHarmonicMinor", {Chord["E",
"min", {1, b3, 5}, {"E4", "G4",
"B4"}]}}, {"C_Major -> E_Enigmatic2", {Chord["F",
"maj", {1, 3, 5}, {"F4", "A4",
"C5"}]}}, {"C_Major -> E_Geez(Ethiopian)", {Chord["A",
"min", {1, b3, 5}, {"A4", "C5", "E5"}],
Chord["E", "min", {1, b3, 5}, {"E4", "G4", "B4"}],
Chord["G",
"maj", {1, 3, 5}, {"G4", "B4",
"D5"}]}}, {"C_Major -> E_HalfWholeDiminished", {Chord["B",
"dim", {1, b3, b5}, {"B4", "D5",
"F5"}]}}, {"C_Major -> E_HarmonicMajor", {Chord["A",
"min", {1, b3, 5}, {"A4", "C5",
"E5"}]}}, {"C_Major -> E_HarmonicMinor", {Chord["A",
"min", {1, b3, 5}, {"A4", "C5", "E5"}],
Chord["E",
"min", {1, b3, 5}, {"E4", "G4",
"B4"}]}}, {"C_Major -> E_HarmonicMinorBebop", {Chord["E",
"min", {1, b3, 5}, {"E4", "G4", "B4"}],
Chord["G",
"maj", {1, 3, 5}, {"G4", "B4",
"D5"}]}}, {"C_Major -> E_Hindu", {Chord["A",
"min", {1, b3, 5}, {"A4", "C5",
"E5"}]}}, {"C_Major -> E_HungarianMajor2", {Chord["B",
"dim", {1, b3, b5}, {"B4", "D5",
"F5"}]}}, {"C_Major -> E_HungarianMinor1", {Chord["E",
"min", {1, b3, 5}, {"E4", "G4", "B4"}],
Chord["G",
"maj", {1, 3, 5}, {"G4", "B4",
"D5"}]}}, {"C_Major -> E_HungarianMinor2", {Chord["E",
"min", {1, b3, 5}, {"E4", "G4",
"B4"}]}}, {"C_Major -> E_Ionianb6", {Chord["A",
"min", {1, b3, 5}, {"A4", "C5",
"E5"}]}}, {"C_Major -> E_Locrian", {Chord["A",
"min", {1, b3, 5}, {"A4", "C5", "E5"}],
Chord["F",
"maj", {1, 3, 5}, {"F4", "A4",
"C5"}]}}, {"C_Major -> E_LocrianBebop", {Chord["B",
"dim", {1, b3, b5}, {"B4", "D5",
"F5"}]}}, {"C_Major -> E_Locrianbb7", {Chord["A",
"min", {1, b3, 5}, {"A4", "C5", "E5"}],
Chord["F",
"maj", {1, 3, 5}, {"F4", "A4",
"C5"}]}}, {"C_Major -> E_Locrian\[Natural]2", {Chord["A",
"min", {1, b3, 5}, {"A4", "C5",
"E5"}]}}, {"C_Major -> E_Lydianb3", {Chord["E",
"min", {1, b3, 5}, {"E4", "G4",
"B4"}]}}, {"C_Major -> E_MajorBlues", {Chord["E",
"min", {1, b3, 5}, {"E4", "G4",
"B4"}]}}, {"C_Major -> E_MelodicMinorAscending", {Chord["E",
"min", {1, b3, 5}, {"E4", "G4",
"B4"}]}}, {"C_Major -> E_MelodicMinorBebop", {Chord["E",
"min", {1, b3, 5}, {"E4", "G4",
"B4"}]}}, {"C_Major -> E_Mixolydianb2", {Chord["B",
"dim", {1, b3, b5}, {"B4", "D5",
"F5"}]}}, {"C_Major -> E_NaturalMinor", {Chord["A",
"min", {1, b3, 5}, {"A4", "C5", "E5"}],
Chord["E", "min", {1, b3, 5}, {"E4", "G4", "B4"}],
Chord["G",
"maj", {1, 3, 5}, {"G4", "B4",
"D5"}]}}, {"C_Major -> E_NeapolitanMajor", {Chord["E",
"min", {1, b3, 5}, {"E4", "G4",
"B4"}]}}, {"C_Major -> E_NeapolitanMinor", {Chord["A",
"min", {1, b3, 5}, {"A4", "C5", "E5"}],
Chord["E", "min", {1, b3, 5}, {"E4", "G4", "B4"}],
Chord["F",
"maj", {1, 3, 5}, {"F4", "A4",
"C5"}]}}, {"C_Major -> E_Persian", {Chord["A",
"min", {1, b3, 5}, {"A4", "C5", "E5"}],
Chord["F",
"maj", {1, 3, 5}, {"F4", "A4",
"C5"}]}}, {"C_Major -> E_Phrygian", {Chord["A",
"min", {1, b3, 5}, {"A4", "C5", "E5"}],
Chord["B", "dim", {1, b3, b5}, {"B4", "D5", "F5"}],
Chord["E", "min", {1, b3, 5}, {"E4", "G4", "B4"}],
Chord["F", "maj", {1, 3, 5}, {"F4", "A4", "C5"}],
Chord["G",
"maj", {1, 3, 5}, {"G4", "B4",
"D5"}]}}, {"C_Major -> E_PhrygianDominant", {Chord["A",
"min", {1, b3, 5}, {"A4", "C5", "E5"}],
Chord["B", "dim", {1, b3, b5}, {"B4", "D5", "F5"}],
Chord["F",
"maj", {1, 3, 5}, {"F4", "A4",
"C5"}]}}, {"C_Major -> E_PhrygianDominantBebop", {Chord
["F",
"maj", {1, 3, 5}, {"F4", "A4",
"C5"}]}}, {"C_Major -> E_Phrygianb4", {Chord["B",
"dim", {1, b3, b5}, {"B4", "D5", "F5"}],
Chord["E", "min", {1, b3, 5}, {"E4", "G4", "B4"}],
Chord["G",
"maj", {1, 3, 5}, {"G4", "B4",
"D5"}]}}, {"C_Major -> E_Phrygian\[Natural]6", {Chord["B",
"dim", {1, b3, b5}, {"B4", "D5", "F5"}],
Chord["E", "min", {1, b3, 5}, {"E4", "G4", "B4"}],
Chord["G",
"maj", {1, 3, 5}, {"G4", "B4",
"D5"}]}}, {"C_Major -> E_RomanianMinor", {Chord["E",
"min", {1, b3, 5}, {"E4", "G4", "B4"}],
Chord["G",
"maj", {1, 3, 5}, {"G4", "B4",
"D5"}]}}, {"C_Major -> E_Spanish8Tone", {Chord["A",
"min", {1, b3, 5}, {"A4", "C5",
"E5"}]}}, {"C_Major -> E_SpanishGypsy", {Chord["A",
"min", {1, b3, 5}, {"A4", "C5", "E5"}],
Chord["B", "dim", {1, b3, b5}, {"B4", "D5", "F5"}],
Chord["F",
"maj", {1, 3, 5}, {"F4", "A4",
"C5"}]}}, {"C_Major -> F_AeolianMajor", {Chord["F",
"maj", {1, 3, 5}, {"F4", "A4",
"C5"}]}}, {"C_Major -> F_Blues4", {Chord["F",
"maj", {1, 3, 5}, {"F4", "A4",
"C5"}]}}, {"C_Major -> F_Blues5", {Chord["B",
"dim", {1, b3, b5}, {"B4", "D5",
"F5"}]}}, {"C_Major -> F_Blues6", {Chord["B",
"dim", {1, b3, b5}, {"B4", "D5",
"F5"}]}}, {"C_Major -> F_Blues8", {Chord["B",
"dim", {1, b3, b5}, {"B4", "D5",
"F5"}]}}, {"C_Major -> F_DominantBebop", {Chord["F",
"maj", {1, 3, 5}, {"F4", "A4",
"C5"}]}}, {"C_Major -> F_Dorian#4", {Chord["B",
"dim", {1, b3, b5}, {"B4", "D5", "F5"}],
Chord["G",
"maj", {1, 3, 5}, {"G4", "B4", "D5"}]}}, {"C_Major -> F_DoubleHarmonicMajor", {Chord["A", "min", {1, b3, 5}, {"A4", "C5", "E5"}],
Chord["F",
"maj", {1, 3, 5}, {"F4", "A4",
"C5"}]}}, {"C_Major -> F_HalfWholeDiminished", {Chord["B", "dim", {1, b3, b5}, {"B4", "D5",
"F5"}]}}, {"C_Major -> F_HarmonicMajor", {Chord["A", "min", {1, b3, 5}, {"A4", "C5", "E5"}],
Chord["F",
"maj", {1, 3, 5}, {"F4", "A4",
"C5"}]}}, {"C_Major -> F_Hindu", {Chord["F", "maj", {1, 3, 5}, {"F4", "A4",
"C5"}]}}, {"C_Major -> F_HungarianMajor1", {Chord["B", "dim", {1, b3, b5}, {"B4", "D5", "F5"}],
Chord["F",
"maj", {1, 3, 5}, {"F4", "A4",
"C5"}]}}, {"C_Major -> F_HungarianMajor2", {Chord["B", "dim", {1, b3, b5}, {"B4", "D5", "F5"}],
Chord["F",
"maj", {1, 3, 5}, {"F4", "A4",
"C5"}]}}, {"C_Major -> F_Ionian", {Chord["A", "min", {1, b3, 5}, {"A4", "C5", "E5"}],
Chord["F",
"maj", {1, 3, 5}, {"F4", "A4",
"C5"}]}}, {"C_Major -> F_Ionianb6", {Chord["A", "min", {1, b3, 5}, {"A4", "C5", "E5"}],
Chord["F",
"maj", {1, 3, 5}, {"F4", "A4",
"C5"}]}}, {"C_Major -> F_Lydian", {Chord["A", "min", {1, b3, 5}, {"A4", "C5", "E5"}],
Chord["B", "dim", {1, b3, b5}, {"B4", "D5", "F5"}],
Chord["F", "maj", {1, 3, 5}, {"F4", "A4", "C5"}],
Chord["G",
"maj", {1, 3, 5}, {"G4", "B4",
"D5"}]}}, {"C_Major -> F_LydianAugmented", {Chord["B", "dim", {1, b3, b5}, {"B4", "D5", "F5"}],
Chord["G",
"maj", {1, 3, 5}, {"G4", "B4",
"D5"}]}}, {"C_Major -> F_LydianAugmented#2", {Chord["B", "dim", {1, b3, b5}, {"B4", "D5",
"F5"}]}}, {"C_Major -> F_LydianDominant", {Chord["B", "dim", {1, b3, b5}, {"B4", "D5", "F5"}],
Chord["F", "maj", {1, 3, 5}, {"F4", "A4", "C5"}],
Chord["G",
"maj", {1, 3, 5}, {"G4", "B4",
"D5"}]}}, {"C_Major -> F_Lydianb3", {Chord["B", "dim", {1, b3, b5}, {"B4", "D5", "F5"}],
Chord["G",
"maj", {1, 3, 5}, {"G4", "B4",
"D5"}]}}, {"C_Major -> F_Lydian#2", {Chord["A", "min", {1, b3, 5}, {"A4", "C5", "E5"}],
Chord["B", "dim", {1, b3, b5}, {"B4", "D5", "F5"}],
Chord["F",
"maj", {1, 3, 5}, {"F4", "A4",
"C5"}]}}, {"C_Major -> F_MajorBebop", {Chord["F", "maj", {1, 3, 5}, {"F4", "A4",
"C5"}]}}, {"C_Major -> F_MinorBlues2", {Chord["F", "maj", {1, 3, 5}, {"F4", "A4",
"C5"}]}}, {"C_Major -> F_MixoBlues", {Chord["B", "dim", {1, b3, b5}, {"B4", "D5",
"F5"}]}}, {"C_Major -> F_Mixolydian", {Chord["F", "maj", {1, 3, 5}, {"F4", "A4",
"C5"}]}}, {"C_Major -> F_Mixolydianb2", {Chord["F", "maj", {1, 3, 5}, {"F4", "A4",
"C5"}]}}, {"C_Major -> F_PhrygianDominant", {Chord["F", "maj", {1, 3, 5}, {"F4", "A4",
"C5"}]}}, {"C_Major -> F_PhrygianDominantBebop", {Chord["F", "maj", {1, 3, 5}, {"F4", "A4",
"C5"}]}}, {"C_Major -> F_RomanianMinor", {Chord["B", "dim", {1, b3, b5}, {"B4", "D5", "F5"}],
Chord["G",
"maj", {1, 3, 5}, {"G4", "B4",
"D5"}]}}, {"C_Major -> F_SpanishGypsy", {Chord["F", "maj", {1, 3, 5}, {"F4", "A4",
"C5"}]}}, {"C_Major -> F_Tritone", {Chord["F", "maj", {1, 3, 5}, {"F4", "A4",
"C5"}]}}, {"C_Major -> F_WholeHalfDiminished", {Chord["B", "dim", {1, b3, b5}, {"B4", "D5",
"F5"}]}}, {"C_Major -> F#_Blues1", {Chord["A", "min", {1, b3, 5}, {"A4", "C5",
"E5"}]}}, {"C_Major -> F#_Blues2", {Chord["A", "min", {1, b3, 5}, {"A4", "C5",
"E5"}]}}, {"C_Major -> F#_Blues3", {Chord["A", "min", {1, b3, 5}, {"A4", "C5",
"E5"}]}}, {"C_Major -> F#_Dorianb5", {Chord["A", "min", {1, b3, 5}, {"A4", "C5",
"E5"}]}}, {"C_Major -> F#_DoubleHarmonicMajor", {Chord[ "G", "maj", {1, 3, 5}, {"G4", "B4",
"D5"}]}}, {"C_Major -> F#_Enigmatic2", {Chord["B", "dim", {1, b3, b5}, {"B4", "D5", "F5"}],
Chord["G",
"maj", {1, 3, 5}, {"G4", "B4",
"D5"}]}}, {"C_Major -> F#_HarmonicMinorBebop", {Chord["B", "dim", {1, b3, b5}, {"B4", "D5",
"F5"}]}}, {"C_Major -> F#_Locrian", {Chord["A", "min", {1, b3, 5}, {"A4", "C5", "E5"}],
Chord["G",
"maj", {1, 3, 5}, {"G4", "B4",
"D5"}]}}, {"C_Major -> F#_Locrianbb7", {Chord[ "G", "maj", {1, 3, 5}, {"G4", "B4",
"D5"}]}}, {"C_Major -> F#_Locrian\[Natural]2", {Chord["A", "min", {1, b3, 5}, {"A4", "C5",
"E5"}]}}, {"C_Major -> F#_Locrian\[Natural]6", {Chord["A", "min", {1, b3, 5}, {"A4", "C5",
"E5"}]}}, {"C_Major -> F#_MajorBebop", {Chord["B", "dim", {1, b3, b5}, {"B4", "D5",
"F5"}]}}, {"C_Major -> F#_MelodicMinorBebop", {Chord["B", "dim", {1, b3, b5}, {"B4", "D5",
"F5"}]}}, {"C_Major -> F#_MinorBlues1", {Chord["A", "min", {1, b3, 5}, {"A4", "C5",
"E5"}]}}, {"C_Major -> F#_NeapolitanMinor", {Chord["G", "maj", {1, 3, 5}, {"G4", "B4",
"D5"}]}}, {"C_Major -> F#_Persian", {Chord["G", "maj", {1, 3, 5}, {"G4", "B4",
"D5"}]}}, {"C_Major -> F#_Phrygian", {Chord["G", "maj", {1, 3, 5}, {"G4", "B4",
"D5"}]}}, {"C_Major -> F#_PhrygianDominant", {Chord["G", "maj", {1, 3, 5}, {"G4", "B4",
"D5"}]}}, {"C_Major -> F#_PhrygianDominantBebop", {Chord[ "B", "dim", {1, b3, b5}, {"B4", "D5", "F5"}],
Chord["G",
"maj", {1, 3, 5}, {"G4", "B4",
"D5"}]}}, {"C_Major -> F#_SpanishGypsy", {Chord["G", "maj", {1, 3, 5}, {"G4", "B4",
"D5"}]}}, {"C_Major -> F#_SuperLocrian", {Chord["A", "min", {1, b3, 5}, {"A4", "C5",
"E5"}]}}, {"C_Major -> F#_SuperLocrianJazz", {Chord["A", "min", {1, b3, 5}, {"A4", "C5",
"E5"}]}}, {"C_Major -> F#_WholeHalfDiminished", {Chord[ "B", "dim", {1, b3, b5}, {"B4", "D5",
"F5"}]}}, {"C_Major -> Gb_Blues1", {Chord["A", "min", {1, b3, 5}, {"A4", "C5",
"E5"}]}}, {"C_Major -> Gb_Blues2", {Chord["A", "min", {1, b3, 5}, {"A4", "C5",
"E5"}]}}, {"C_Major -> Gb_Blues3", {Chord["A", "min", {1, b3, 5}, {"A4", "C5",
"E5"}]}}, {"C_Major -> Gb_Dorianb5", {Chord["A", "min", {1, b3, 5}, {"A4", "C5",
"E5"}]}}, {"C_Major -> Gb_DoubleHarmonicMajor", {Chord["G", "maj", {1, 3, 5}, {"G4", "B4",
"D5"}]}}, {"C_Major -> Gb_Enigmatic2", {Chord["B", "dim", {1, b3, b5}, {"B4", "D5", "F5"}],
Chord["G",
"maj", {1, 3, 5}, {"G4", "B4",
"D5"}]}}, {"C_Major -> Gb_HarmonicMinorBebop", {Chord["B", "dim", {1, b3, b5}, {"B4", "D5",
"F5"}]}}, {"C_Major -> Gb_Locrian", {Chord["A", "min", {1, b3, 5}, {"A4", "C5", "E5"}],
Chord["G",
"maj", {1, 3, 5}, {"G4", "B4",
"D5"}]}}, {"C_Major -> Gb_Locrianbb7", {Chord[ "G", "maj", {1, 3, 5}, {"G4", "B4",
"D5"}]}}, {"C_Major -> Gb_Locrian\[Natural]2", {Chord["A", "min", {1, b3, 5}, {"A4", "C5",
"E5"}]}}, {"C_Major -> Gb_Locrian\[Natural]6", {Chord["A", "min", {1, b3, 5}, {"A4", "C5",
"E5"}]}}, {"C_Major -> Gb_MajorBebop", {Chord["B", "dim", {1, b3, b5}, {"B4", "D5", "F5"}]}}, {"C_Major -> Gb_MelodicMinorBebop", {Chord["B", "dim", {1, b3, b5}, {"B4", "D5", "F5"}]}}, {"C_Major -> Gb_MinorBlues1", {Chord["A", "min", {1, b3, 5}, {"A4", "C5", "E5"}]}}, {"C_Major -> Gb_NeapolitanMinor", {Chord["G", "maj", {1, 3, 5}, {"G4", "B4", "D5"}]}}, {"C_Major -> Gb_Persian", {Chord["G", "maj", {1, 3, 5}, {"G4", "B4", "D5"}]}}, {"C_Major -> Gb_Phrygian", {Chord["G", "maj", {1, 3, 5}, {"G4", "B4", "D5"}]}}, {"C_Major -> Gb_PhrygianDominant", {Chord["G", "maj", {1, 3, 5}, {"G4", "B4", "D5"}]}}, {"C_Major -> Gb_PhrygianDominantBebop", {Chord[ "B", "dim", {1, b3, b5}, {"B4", "D5", "F5"}], Chord["G", "maj", {1, 3, 5}, {"G4", "B4", "D5"}]}}, {"C_Major -> Gb_SpanishGypsy", {Chord["G", "maj", {1, 3, 5}, {"G4", "B4", "D5"}]}}, {"C_Major -> Gb_SuperLocrian", {Chord["A", "min", {1, b3, 5}, {"A4", "C5", "E5"}]}}, {"C_Major -> Gb_SuperLocrianJazz", {Chord["A", "min", {1, b3, 5}, {"A4", "C5", "E5"}]}}, {"C_Major -> Gb_WholeHalfDiminished", {Chord["B", "dim", {1, b3, b5}, {"B4", "D5", "F5"}]}}, {"C_Major -> G_AeolianMajor", {Chord["B", "dim", {1, b3, b5}, {"B4", "D5", "F5"}], Chord["G", "maj", {1, 3, 5}, {"G4", "B4", "D5"}]}}, {"C_Major -> G_Blues4", {Chord["B", "dim", {1, b3, b5}, {"B4", "D5", "F5"}], Chord["G", "maj", {1, 3, 5}, {"G4", "B4", "D5"}]}}, {"C_Major -> G_Blues5", {Chord["B", "dim", {1, b3, b5}, {"B4", "D5", "F5"}]}}, {"C_Major -> G_DominantBebop", {Chord["A", "min", {1, b3, 5}, {"A4", "C5", "E5"}], Chord["B", "dim", {1, b3, b5}, {"B4", "D5", "F5"}], Chord["G", "maj", {1, 3, 5}, {"G4", "B4", "D5"}]}}, {"C_Major -> G_Dorian", {Chord["A", "min", {1, b3, 5}, {"A4", "C5", "E5"}]}}, {"C_Major -> G_DorianBebop", {Chord["B", "dim", {1, b3, b5}, {"B4", "D5", "F5"}]}}, {"C_Major -> G_Dorianb5", {Chord["A", "min", {1, b3, 5}, {"A4", "C5", "E5"}]}}, {"C_Major -> G_DoubleHarmonicMajor", {Chord["G", "maj", {1, 3, 5}, {"G4", "B4", "D5"}]}}, {"C_Major -> G_HalfWholeDiminished", {Chord["B", "dim", {1, b3, b5}, {"B4", "D5", "F5"}]}}, {"C_Major -> G_HarmonicMajor", {Chord["G", "maj", {1, 3, 5}, {"G4", "B4", "D5"}]}}, {"C_Major -> G_Hindu", {Chord["B", "dim", {1, b3, b5}, {"B4", "D5", "F5"}], Chord["G", "maj", {1, 3, 5}, {"G4", "B4", "D5"}]}}, {"C_Major -> G_HungarianMajor1", {Chord["B", "dim", {1, b3, b5}, {"B4", "D5", "F5"}], Chord["G", "maj", {1, 3, 5}, {"G4", "B4", "D5"}]}}, {"C_Major -> G_HungarianMajor2", {Chord["B", "dim", {1, b3, b5}, {"B4", "D5", "F5"}], Chord["G", "maj", {1, 3, 5}, {"G4", "B4", "D5"}]}}, {"C_Major -> G_Ionian", {Chord["A", "min", {1, b3, 5}, {"A4", "C5", "E5"}], Chord["G", "maj", {1, 3, 5}, {"G4", "B4", "D5"}]}}, {"C_Major -> G_Ionianb6", {Chord["G", "maj", {1, 3, 5}, {"G4", "B4", "D5"}]}}, {"C_Major -> G_Lydian", {Chord["G", "maj", {1, 3, 5}, {"G4", "B4", "D5"}]}}, {"C_Major -> G_LydianDominant", {Chord["B", "dim", {1, b3, b5}, {"B4", "D5", "F5"}], Chord["G", "maj", {1, 3, 5}, {"G4", "B4", "D5"}]}}, {"C_Major -> G_Lydian#2", {Chord["G", "maj", {1, 3, 5}, {"G4", "B4", "D5"}]}}, {"C_Major -> G_MajorAugmented", {Chord["A", "min", {1, b3, 5}, {"A4", "C5", "E5"}]}}, {"C_Major -> G_MajorBebop", {Chord["G", "maj", {1, 3, 5}, {"G4", "B4", "D5"}]}}, {"C_Major -> G_MelodicMinorAscending", {Chord["A", "min", {1, b3, 5}, {"A4", "C5", "E5"}]}}, {"C_Major -> G_MinorBebop", {Chord["B", "dim", {1, b3, b5}, {"B4", "D5", "F5"}]}}, {"C_Major -> G_MinorBlues2", {Chord["G", "maj", {1, 3, 5}, {"G4", "B4", "D5"}]}}, {"C_Major -> G_Mixolydian", {Chord["A", "min", {1, b3, 5}, {"A4", "C5", "E5"}], Chord["B", "dim", {1, b3, b5}, {"B4", "D5", "F5"}], Chord["G", "maj", {1, 3, 5}, {"G4", "B4", "D5"}]}}, {"C_Major -> G_Mixolydianb2", {Chord["B", "dim", {1, b3, b5}, {"B4", "D5", "F5"}], Chord["G", "maj", {1, 3, 5}, {"G4", "B4", "D5"}]}}, {"C_Major -> G_PhrygianDominant", {Chord["B", "dim", {1, b3, b5}, {"B4", "D5", "F5"}], Chord["G", "maj", {1, 3, 5}, {"G4", "B4", "D5"}]}}, {"C_Major -> G_PhrygianDominantBebop", {Chord["B", "dim", {1, b3, b5}, {"B4", "D5", "F5"}], Chord["G", "maj", {1, 3, 5}, {"G4", "B4", "D5"}]}}, {"C_Major -> G_SpanishGypsy", {Chord["B", "dim", {1, b3, b5}, {"B4", "D5", "F5"}], Chord["G", "maj", {1, 3, 5}, {"G4", "B4", "D5"}]}}, {"C_Major -> G_Tritone", {Chord["G", "maj", {1, 3, 5}, {"G4", "B4", "D5"}]}}, {"C_Major -> G#_Blues5", {Chord["B", "dim", {1, b3, b5}, {"B4", "D5", "F5"}]}}, {"C_Major -> G#_Blues6", {Chord["B", "dim", {1, b3, b5}, {"B4", "D5", "F5"}]}}, {"C_Major -> G#_DiminishedLocrian", {Chord["A", "min", {1, b3, 5}, {"A4", "C5", "E5"}], Chord["B", "dim", {1, b3, b5}, {"B4", "D5", "F5"}]}}, {"C_Major -> G#_HalfWholeDiminished", {Chord[ "B", "dim", {1, b3, b5}, {"B4", "D5", "F5"}]}}, {"C_Major -> G#_HungarianMajor1", {Chord["B", "dim", {1, b3, b5}, {"B4", "D5", "F5"}]}}, {"C_Major -> G#_Locrianbb7", {Chord[ "B", "dim", {1, b3, b5}, {"B4", "D5", "F5"}]}}, {"C_Major -> G#_LydianAugmented#2", \ {Chord["B", "dim", {1, b3, b5}, {"B4", "D5", "F5"}]}}, {"C_Major -> G#_Lydian#2", {Chord["B", "dim", {1, b3, b5}, {"B4", "D5", "F5"}]}}, {"C_Major -> G#_Phrygianb4", {Chord["A", "min", {1, b3, 5}, {"A4", "C5", "E5"}]}}, {"C_Major -> G#_SuperLocrian", {Chord["A", "min", {1, b3, 5}, {"A4", "C5", "E5"}]}}, {"C_Major -> G#_SuperLocrianJazz", {Chord["A", "min", {1, b3, 5}, {"A4", "C5", "E5"}]}}, {"C_Major -> G#_WholeHalfDiminished", {Chord[ "B", "dim", {1, b3, b5}, {"B4", "D5", "F5"}]}}, {"C_Major -> Ab_Blues5", {Chord["B", "dim", {1, b3, b5}, {"B4", "D5", "F5"}]}}, {"C_Major -> Ab_Blues6", {Chord["B", "dim", {1, b3, b5}, {"B4", "D5", "F5"}]}}, {"C_Major -> Ab_DiminishedLocrian", {Chord["A", "min", {1, b3, 5}, {"A4", "C5", "E5"}], Chord["B", "dim", {1, b3, b5}, {"B4", "D5", "F5"}]}}, {"C_Major -> Ab_HalfWholeDiminished", {Chord["B", "dim", {1, b3, b5}, {"B4", "D5", "F5"}]}}, {"C_Major -> Ab_HungarianMajor1", {Chord["B", "dim", {1, b3, b5}, {"B4", "D5", "F5"}]}}, {"C_Major -> Ab_Locrianbb7", {Chord[ "B", "dim", {1, b3, b5}, {"B4", "D5", "F5"}]}}, {"C_Major -> Ab_LydianAugmented#2", \ {Chord["B", "dim", {1, b3, b5}, {"B4", "D5", "F5"}]}}, {"C_Major -> Ab_Lydian#2", {Chord["B", "dim", {1, b3, b5}, {"B4", "D5", -continued "F5"}]}}, {"C_Major -> Ab_Phrygianb4", {Chord["A", "min", {1, b3, 5}, {"A4", "C5", "E5"}]}}, {"C_Major -> Ab_SuperLocrian", {Chord["A", "min", {1, b3, 5}, {"A4", "C5", "E5"}]}}, {"C_Major -> Ab_SuperLocrianJazz", {Chord["A", "min", {1, b3, 5}, {"A4", "C5", "E5"}]}}, {"C_Major -> Ab_WholeHalfDiminished", {Chord["B", "dim", {1, b3, b5}, {"B4", "D5", "F5"}]}}, {"C_Major -> A_Aeolian", {Chord["A", "min", {1, b3, 5}, {"A4", "C5", "E5"}], Chord["B", "dim", {1, b3, b5}, {"B4", "D5", "F5"}]}}, {"C_Major -> A_AeolianMajor", {Chord["B", "dim", {1, b3, b5}, {"B4", "D5", "F5"}]}}, {"C_Major -> A_Arabic", {Chord["B", "dim", {1, b3, b5}, {"B4", "D5", "F5"}]}}, {"C_Major -> A_Byzantine", {Chord["B", "dim", {1, b3, b5}, {"B4", "D5", "F5"}]}}, {"C_Major -> A_Dorian", {Chord["A", "min", {1, b3, 5}, {"A4", "C5", "E5"}]}}, {"C_Major -> A_Dorian#4", {Chord["A", "min", {1, b3, 5}, {"A4", "C5", "E5"}]}}, {"C_Major -> A_DoubleHarmonicMinor", {Chord["A", "min", {1, b3, 5}, {"A4", "C5", "E5"}]}}, {"C_Major -> A_Geez(Ethiopian)", {Chord["A", "min", {1, b3, 5}, {"A4", "C5", "E5"}], Chord["B", "dim", {1, b3, b5}, {"B4", "D5", "F5"}]}}, {"C_Major -> A_HarmonicMajor", {Chord["B", "dim", {1, b3, b5}, {"B4", "D5", "F5"}]}}, {"C_Major -> A_HarmonicMinor", {Chord["A", "min", {1, b3, 5}, {"A4", "C5", "E5"}], Chord["B", "dim", {1, b3, b5}, {"B4", "D5", "F5"}]}}, {"C_Major -> A_HarmonicMinorBebop", {Chord["A", "min", {1, b3, 5}, {"A4", "C5", "E5"}], Chord["B", "dim", {1, b3, b5}, {"B4", "D5", "F5"}]}}, {"C_Major -> A_Hindu", {Chord["B", "dim", {1, b3, b5}, {"B4", "D5", "F5"}]}}, {"C_Major -> A_HungarianMinor1", {Chord["A", "min", {1, b3, 5}, {"A4", "C5", "E5"}]}}, {"C_Major -> A_HungarianMinor2", {Chord["A", "min", {1, b3, 5}, {"A4", "C5", "E5"}]}}, {"C_Major -> A_Ionianb6", {Chord["B", "dim", {1, b3, b5}, {"B4", "D5", "F5"}]}}, {"C_Major -> A_Locrian\[Natural]2", {Chord["B", "dim", {1, b3, b5}, {"B4", "D5", "F5"}]}}, {"C_Major -> A_Lydianb3", {Chord["A", "min", {1, b3, 5}, {"A4", "C5", "E5"}]}}, {"C_Major -> A_MajorBebop", {Chord["B", "dim", {1, b3, b5}, {"B4", "D5", "F5"}]}}, {"C_Major -> A_MajorBlues", {Chord["A", "min", {1, b3, 5}, {"A4", "C5", "E5"}]}}, {"C_Major -> A_MelodicMinorAscending", {Chord ["A", "min", {1, b3, 5}, {"A4", "C5", "E5"}]}}, {"C_Major -> A_MelodicMinorBebop", {Chord["A", "min", {1, b3, 5}, {"A4", "C5", "E5"}], Chord["B", "dim", {1, b3, b5}, {"B4", "D5", "F5"}]}}, {"C_Major -> A_NaturalMinor", {Chord["A", "min", {1, b3, 5}, {"A4", "C5", "E5"}], Chord["B", "dim", {1, b3, b5}, {"B4", "D5", "F5"}]}}, {"C_Major -> A_NeapolitanMajor", {Chord["A", "min", {1, b3, 5}, {"A4", "C5", "E5"}]}}, {"C_Major -> A_NeapolitanMinor", {Chord["A", "min", {1, b3, 5}, {"A4", "C5", "E5"}]}}, {"C_Major -> A_Phrygian", {Chord["A", "min", {1, b3, 5}, {"A4", "C5", "E5"}]}}, {"C_Major -> A_Phrygianb4", {Chord["A", "min", {1, b3, 5}, {"A4", "C5", "E5"}]}}, {"C_Major -> A_Phrygian\[Natural]6", {Chord["A", "min", {1, b3, 5}, {"A4", "C5", "E5"}]}}, {"C_Major -> A_RomanianMinor", {Chord["A", "min", {1, b3, 5}, {"A4", "C5", "E5"}]}}, {"C_Major -> A_WholeHalfDiminished", {Chord["B", "dim", {1, b3, b5}, {"B4", "D5", "F5"}]}}, {"C_Major -> A#_Blues5", {Chord["B", "dim", {1, b3, b5}, {"B4", "D5", "F5"}]}}, {"C_Major -> A#_HalfWholeDiminished", {Chord[ "B", "dim", {1, b3, b5}, {"B4", "D5", "F5"}]}}, {"C_Major -> Bb_Blues5", {Chord["B", "dim", {1, b3, b5}, {"B4", "D5", "F5"}]}}, {"C_Major -> Bb_HalfWholeDiminished", {Chord["B", "dim", {1, b3, b5}, {"B4", "D5", "F5"}]}}, {"C_Major -> B_Algerian", {Chord["B", "dim", {1, b3, b5}, {"B4", "D5", "F5"}]}}, {"C_Major -> B_Blues3", {Chord["B", "dim", {1, b3, b5}, {"B4", "D5", "F5"}]}}, {"C_Major -> B_Blues5", {Chord["B", "dim", {1, b3, b5}, {"B4", "D5", "F5"}]}}, {"C_Major -> B_Blues6", {Chord["B", "dim", {1, b3, b5}, {"B4", "D5", "F5"}]}}, {"C_Major -> B_DiminishedLocrian", {Chord["B", "dim", {1, b3, b5}, {"B4", "D5", "F5"}]}}, {"C_Major -> B_Dorianb5", {Chord["B", "dim", {1, b3, b5}, {"B4", "D5", "F5"}]}}, {"C_Major -> B_HalfWholeDiminished", {Chord["B", "dim", {1, b3, b5}, {"B4", "D5", "F5"}]}}, {"C_Major -> B_Locrian", {Chord["B", "dim", {1, b3, b5}, {"B4", "D5", "F5"}]}}, {"C_Major -> B_LocrianBebop", {Chord["B", "dim", {1, b3, b5}, {"B4", "D5", "F5"}]}}, {"C_Major -> B_Locrianbb7", {Chord["B", "dim", {1, b3, b5}, {"B4", "D5", "F5"}]}}, {"C_Major -> B_Locrian\[Natural]2", {Chord["B", "dim", {1, b3, b5}, {"B4", "D5", "F5"}]}}, {"C_Major -> B_Locrian\[Natural]6", {Chord["B", "dim", {1, b3, b5}, {"B4", "D5", "F5"}]}}, {"C_Major -> B_NineToneScale", {Chord["B", "dim", {1, b3, b5}, {"B4", "D5", "F5"}]}}, {"C_Major -> B_SuperLocrian", {Chord["B", "dim", {1, b3, b5}, {"B4", "D5", "F5"}]}}, {"C_Major -> B_SuperLocrianJazz", {Chord["B", "dim", {1, b3, b5}, {"B4", "D5", "F5"}]}}, {"C_Major -> B_WholeHalfDiminished", {Chord["B", "dim", {1, b3, b5}, {"B4", "D5", "F5"}]}}}

While the above example illustrates many possible pivot chords that may be used to pivot from the key of C maj to many possible other keys, in accordance with the present systems, devices, and methods some implementations may employ pivot chords that involve inversions of various chords. That is, if a first chord is included in a first key and not in a second key, but an inversion of the first chord is included in the second key, then in accordance with the present systems, devices, and methods a key modulation may pivot from the first chord in the first key to the inversion of the first chord in the second key. For example, some of the chords of a Japanese scale can be shown to be equivalent to inversions of various major or minor chords in a Western scale. In general, an aesthetic key modulation from key1=root1/scale1 to key2=root2/scale2 may be achieved when either: (a) they share some common ("pivot") chords, or (b) they share some common inversions of chords that may, in accordance with the present systems, devices, and methods, be treated as pivot chords.

For example, the chords of the Western key "D Natural Minor" (root=D, scale=NaturalMinor) are:

I. Chord["D", "min", {1, b3, 5}, {"D4", "F4", "A4"}],
II. Chord["E", "dim", {1, b3, b5}, {"E4", "G4", "Bb4"}],
III. Chord["F", "maj", {1, 3, 5}, {"F4", "A4", "C5"}],
IV. Chord["G", "min", {1, b3, 5}, {"G4", "Bb4", "D5"}],
V. Chord["A", "min", {1, b3, 5}, {"A4", "C5", "E5"}],
VI. Chord["Bb", "maj", {1, 3, 5}, {"Bb4", "D5", "F5"}],
VII. Chord["C", "maj", {1, 3, 5}, {"C5", "E5", "G5"}]

And the chords of the key "E Japanese" (root=E, scale=Japanese) are:

I. Chord["E", "1-#3-###5", {1, #3, ###5}, {"E4", "A4", "D5"}],

II. Chord["F", "1-##3-####5", {1, ##3, ####5}, {"F4", "B4", "E5"}],

III. Chord["A", "1-#3-#5", {1, #3, #5}, {"A4", "D5", "F5"}],

IV. Chord["B", "1-#3-###5", {1, #3, ###5}, {"B4", "E5", "A5"}],

V. Chord["D", "1-b3-##5", {1, b3, ##5}, {"D5", "F5", "B5"}]}]

In accordance with the present systems, devices, and methods, the "D min" chord of the "D Natural Minor" key has notes {D4, F4, A4} and the "A 1-#3-#5" chord of the "E Japanese" key has notes {A4, D5, F5}, which are the same notes but in a different order. In fact, the second inversion of the "A 1-#3-#5" chord of the "E Japanese" key is equivalent to the "D min" chord of the "D Natural/Minor" key. Thus, in accordance with the present systems, devices, and methods the inversion of a chord in a first key may be used to modulate into a second key.

Leading Chord Modulation

Another method for modulating between two keys is not to use a pivot chord (a chord common to both keys) but rather to terminate a first chord progression diatonic to a first key in a chord that is able to lead into a chord of a next key. For example, as the Roman II (two) chord and Roman IV (four) chord can aesthetically precede the Roman V (five) chord in any major key chord progression, a chord progression that is diatonic to, for example, C maj may be terminated in either the Roman II (two) chord of the key of C maj, (i.e., the chord D min), or in the Roman IV (four) chord of the key of C maj, (i.e., the chord F), and then progress to the Roman V (five) chord of C maj (which is also the Roman I chord of the key of G maj).

It is possible to find keys that are even more straightforward to modulate between because they contain exactly the same chords, albeit in a different order. For example, returning to FIG. 1 showing the Circle of Fifths 100 as an example, the keys on the outer circle are also related harmonically to the corresponding key in the radial direction on the inner circle. Specifically, each key on the inner (outer) circle is the relative minor (relative major) of the corresponding key in the radial direction on the outer (inner) circle. Such keys share exactly the same set of notes, and generally modulate aesthetically from one to the other. Thus, comparing the chords of the key of C maj (outer circle) with the chords of A min (inner circle), both keys share exactly the same chords but their orders (their Roman numeral positions/roles) differ. See the chords in the C maj and A min keys below for an example:

C Maj

I. Chord["C", "maj", {1, 3, 5}, {"C4", "E4", "G4"}],

II. Chord["D", "min", {1, b3, 5}, {"D4", "F4", "A4"}],

III. Chord["E", "min", {1, b3, 5}, {"E4", "G4", "B4"}],

IV. Chord["F", "maj", {1, 3, 5}, {"F4", "A4", "C5"}],

V. Chord["G", "maj", {1, 3, 5}, {"G4", "B4", "D5"}],

VI. Chord["A", "min", {1, b3, 5}, {"A4", "C5", "E5"}],

VII. Chord["B", "dim", {1, b3, b5}, {"B4", "D5", "F5"}]}

A Min

I. Chord["A", "min", {1, b3, 5}, {"A4", "C5", "E5"}],

II. Chord["B", "dim", {1, b3, b5}, {"B4", "D5", "F5"}],

III. Chord["C", "maj", {1, 3, 5}, {"C5", "E5", "G5"}],

IV. Chord["D", "min", {1, b3, 5}, {"D5", "F5", "A5"}],

V. Chord["E", "min", {1, b3, 5}, {"E5", "G5", "B5"}],

VI. Chord["F", "maj", {1, 3, 5}, {"F5", "A5", "C6"}],

VII. Chord["G", "maj", {1, 3, 5}, {"G5", "B5", "D6"}]}

Thus, another method of key modulation is to switch from a major key to its relative minor, or from a minor key to its relative major.

Figure 2:
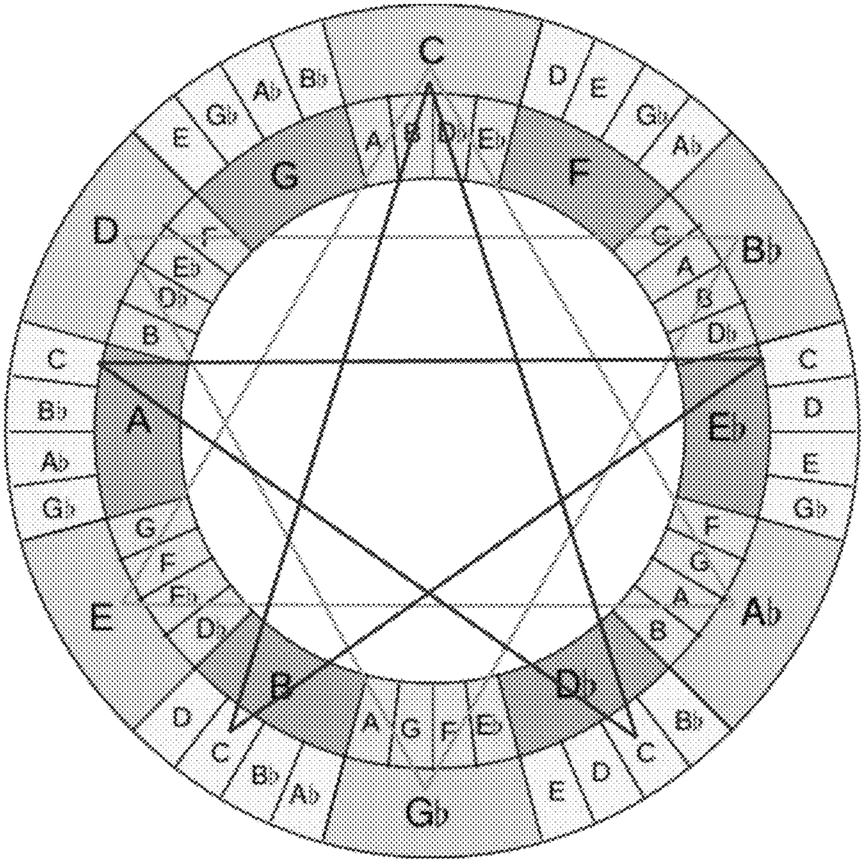
PRIOR ART FIGURE 2
FIG. 2 is an illustrative diagram showing an example of the Coltrane Circle.

The Circle of Fifths (a.k.a. Circle of Fourths when going counterclockwise) 100 is but one established diagram representing harmonic relationships between musical keys. A person of skill in the art will appreciate that alternative diagrammatic representations are known including, for example, "The Coltrane Circle." FIG. 2 is an illustrative diagram showing an example of The Coltrane Circle 200.

In accordance with the present systems, devices, and methods, the Circle of Fifths 100, the Coltrane Circle 200, and any such diagrams/relationships or frameworks may be adopted to build an operational system used by a computer-based musical composition system for synthesizing aesthetically pleasing chord progressions and key modulations.

Returning to the Circle of Fifths 100 as an illustrative example, the theory diagram (100) may, in accordance with the present systems, devices, and methods, be interpreted as a graph whose nodes are the various keys and whose edges represent the feasible key to key transitions (due to neighbor relationships and/or the existence of pivot chords between the keys). In this construction, determining, by the computer-based musical composition system, what new key to change to may include identifying a first node in the graph that corresponds to a current key and selecting a new key corresponding to a second node in the graph that is connected to the first node. With the theory diagram constructed as a graph, in accordance with the present systems, devices, and methods additional structure may be imposed, namely a directionality and/or weight to each edge in the graph.

Thus, from one Circle of Fifths 100 diagram a family of graphs may be constructed representing a biased set of transition probabilities between the nodes (i.e., musical keys). For example, the edges within each circle may be clockwise directed, counter-clockwise directed, conditionally-directed, or undirected. Similarly, the edges on the radii may be inwardly directed, outwardly directed, conditionally directed, or undirected.

As an illustrative example, consider a model that has clockwise directed edges on the major and minor circles, and conditionally directed edges on the radii such that a movement along a radius can be in either direction but once moved the retrograde move is then disallowed for the next step of the process. Such a graph can be used to define a probability transition matrix of a stochastic process amongst musical keys that will have the property of generally moving the progression in a clockwise direction around the Circle of Fifths 100 but can sometimes move inwardly (from a major key to its relative minor), but thereafter not back again to the key it just came from. Likewise, if (in this particular exemplary construction) the process began in a state representing a minor key, it could move clockwise to another minor key or radially outward to a major key. However, once in that major key it would be blocked from a retrograde move back to the minor key from which it came for the next move only. In this fashion the process can move generally in a clockwise direction but occasionally radially, giving the progression a sense of generally forward movement.

In some implementations, weights may be applied to the edges to bias, for example, the ratio of major to major, major to minor, minor to major or minor to minor moves. Such moves tend to control the overall "mood" of the progression as generally happier (more major) versus generally sadder (more minor).

Thus, at least the following types of Circle of Fifths 100 progressions may be implemented:

"Clockwise_RadiallyInward_Weighted",
"Clockwise_RadiallyInward_Unweighted",
"Clockwise_RadiallyOutward_Weighted",
"Clockwise_RadiallyOutward_Unweighted",
"Clockwise_RadiallyConditional_Weighted",
"Clockwise_RadiallyConditional_Unweighted",
"Clockwise_RadiallyUndirected_Weighted",
"Clockwise_RadiallyUndirected_Unweighted",
"CounterClockwise_RadiallyInward_Weighted",
"CounterClockwise_RadiallyInward_Unweighted",
"CounterClockwise_RadiallyOutward_Weighted",
"CounterClockwise_RadiallyOutward_Unweighted",
"CounterClockwise_RadiallyConditional_Weighted",
"CounterClockwise_RadiallyConditional_Unweighted",
"CounterClockwise_RadiallyUndirected_Weighted",
"CounterClockwise_RadiallyUndirected_Unweighted",
"CircumferallyConditonal_RadiallyInward_Weighted",
"CircumferallyConditonal_Radiallylnward_Unweighted",
"CircumferallyConditonal_RadiallyOutward_Weighted",
"CircumferallyConditonal_RadiallyOutward_Unweighted",
"CircumferallyConditonal_RadiallyConditional_Weighted",
"CircumferallyConditonal_RadiallyConditional_Unweighted",
"CircumferallyConditonal_RadiallyUndirected_Weighted",
"CircumferallyConditonal_RadiallyUndirected_Unweighted",
"CircumferallyUndirected_Radiallylnward_Weighted",
"CircumferallyUndirected_Radiallylnward_Unweighted",
"CircumferallyUndirected_RadiallyOutward_Weighted",
"CircumferallyUndirected_RadiallyOutward_Unweighted",
"CircumferallyUndirected_RadiallyConditional_Weighted",
"CircumferallyUndirected_RadiallyConditional_Unweighted",
"CircumferallyUndirected_RadiallyUndirected_Weighted",
"CircumferallyUndirected_RadiallyUndirected_Unweighted"

Although the above example uses the theory diagram of the Circle of Fifths 100 as a motivating example, in accordance with the present systems, devices, and methods the same principles may be applied to operationalize any such diagram (e.g., The Coltrane Circle 200, the Twelve Bar Blues, the Tonnetz Lattice/Graph, and so on) either instead or in combination depending on the specific implementation.

The various implementations described herein include methods for using theoretical understandings of harmonic progression embodied diagrammatically (e.g., in Circle of Fifths 100 and/or Coltrane Circle 200) to build a suite of stochastic models that may be deployed by a computer-based musical composition system to autonomously (or with some human user direction) devise or apply an aesthetic key modulation in a musical composition. Such is an example of enabling a computer-based musical composition system to decide what key to transition to in accordance with the present systems, devices, and methods.

B) Enabling a Computer-Based Musical Composition System to Decide when to Transition to a New Key In accordance with the present systems, devices, and methods, the teachings from Segmentation Patent and Harmony Patent may be invoked or applied as part of enabling a computer-based musical composition system to determine when to transition to a new key. Such teachings include, without limitation, systems, devices, and methods for: (a) decomposing a musical composition into a sequence of data structures representing the bars of the music, which each bar having defined boundaries; (b) automatically determining transitions in (and boundaries between) the harmonic structure of the music; and (c) automatically partitioning the music into, and thereby defining respective boundaries between, a sequence of abutting segments each demarking regions or portions of the music that are musically "coherent", i.e., qualitatively distinct from abutting segments. In accordance with the present systems, devices, and methods, each of these boundaries (among other things) may be used by an automated computer-based musical composition system in determining when to change key in a musical composition.

Specifically, key changes may be applied at the following events:

At the boundary of each bar per (a) above

At the boundary of each change in harmonic element per (b) above (E.g., if the harmonic structure (synchronized to the bar structure) is HarmonicStructure[{e1, e2, . . . , eN},{e1→{1, 1, 2, 3, 1, 3, 3, 3}, e2, . . . }], the key may be changed at the boundaries between 1 & 2, 2 & 3, 3 & 1, and 1 & 3)

At the boundary of each segment per (c) above (in the above, this would be at the boundaries between segments e1 & e2, e2 & e3, etc.)

In some implementations, when constructing chord progressions with modulating (changing) keys across segment boundaries (i.e., per (c) above) the segments may advantageously be clustered by their ear, eye, or note sequence, similar to the methods of clustering bars described in Segmentation Patent and Harmony Patent. That is, starting with a segmented music composition in the form:

Music[{e1, e2, e3, e4, eN}, {e1→bars1, e2→bars2, e3→bars3, eN→barsN}]

a sequence of key modulations (with changes at the boundaries between segments) may, in accordance with the present systems, devices, and methods, be constructed as follows:

perform, by a computer-based musical composition system, an automated clustering of the segments to group segments that are similar together; and solve, by the computer-based musical composition system, a constraint satisfaction problem that specifies that:

every segment is assigned some key;

segments in the same cluster are assigned the same key;

segments that abut one another are assigned respective keys that conform to an allowed key to key transition with respect to the key progression generation model, e.g., as derived from the Circle of Fifths 100 or a similar sort harmonic flow diagram, as described herein in the context of enabling a computer-based musical composition system to determine what new key to change to.

Figure 3:
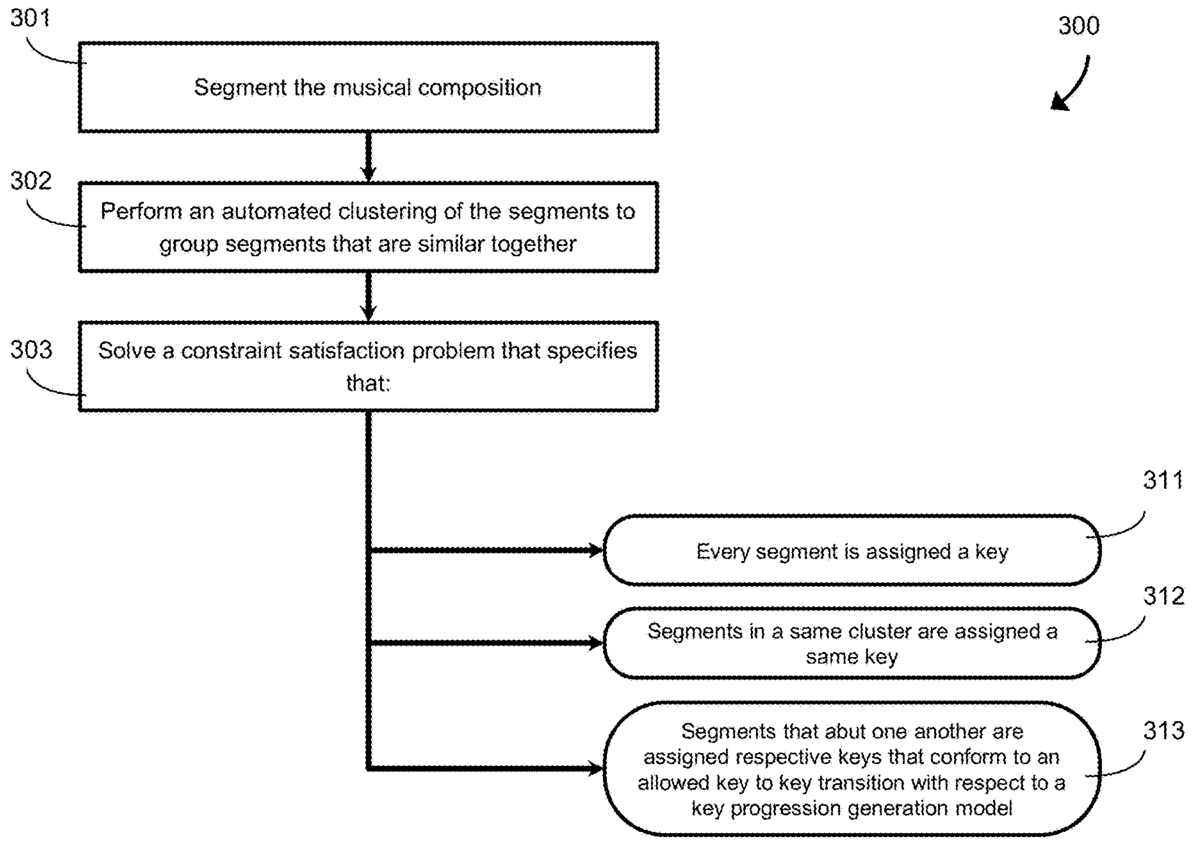
FIG. 3 is a flow diagram of a computer-implemented method of deciding when to transition to a new key in accordance with the present systems, devices, and methods.
Figure 6:
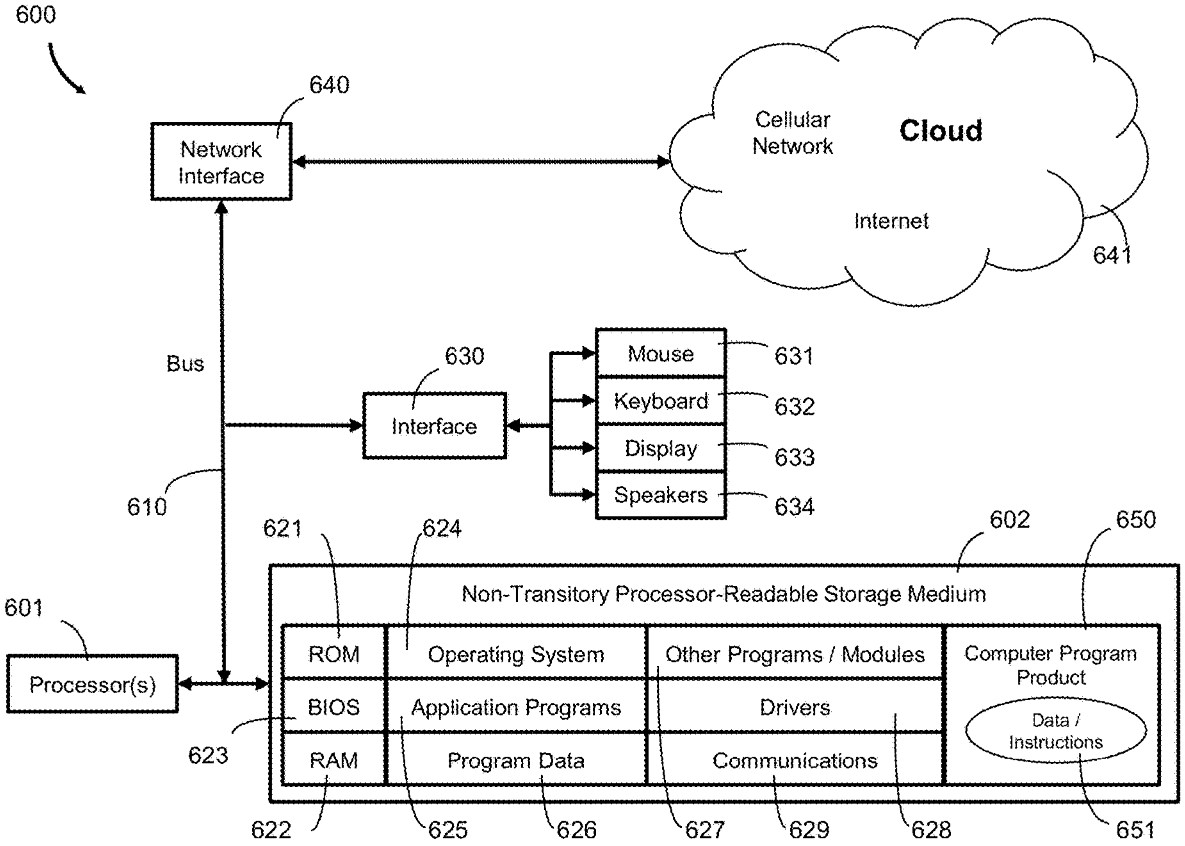
FIG. 6 is an illustrative diagram of a computer-based musical composition system suitable at a high level for performing the various computer-implemented methods described in the present systems, devices, and methods.

FIG. 3 is a flow diagram of a computer-implemented method 300 of deciding when to transition to a new key in accordance with the present systems, devices, and methods. Method 300 illustrates the exemplary method described above. In general, throughout this specification and the appended claims, a computer-implemented method is a method in which the various acts are performed by one or more processor-based computer system(s), such as a computer-based musical composition system. For example, certain acts of a computer-implemented method may be performed by at least one processor communicatively coupled to at least one non-transitory processor-readable storage medium or memory (hereinafter referred to as a non-transitory processor-readable storage medium) and, in some implementations, certain acts of a computer-implemented method may be performed by peripheral components of the computer system that are communicatively coupled to the at least one processor, such as interface devices, sensors, communications and networking hardware, and so on. The non-transitory processor-readable storage medium may store data and/or processor-executable instructions that, when executed by the at least one processor, cause the computer system to perform the method and/or cause the at least one processor to perform those acts of the method that are performed by the at least one processor. FIG. 6 and the written descriptions thereof provide illustrative examples of computer systems that are suitable to perform the computer-implemented methods described herein.

Returning to FIG. 3, method 300 includes three acts 301, 302, and 303, as well as three constraints 311, 312, and 313, though those of skill in the art will appreciate that in alternative implementations certain acts/constraints may be omitted and/or additional acts/constraints may be added. Those of skill in the art will also appreciate that the illustrated order of the acts/constraints is shown for exemplary purposes only and may change in alternative implementations.

At 301, the computer-based musical composition system applies the teachings of Segmentation Patent to segment a musical composition into segments.

At 302, the computer-based musical composition system performs an automated clustering of the segments determined at 301 to group segments that are similar together. The automated clustering may employ, for example, the teachings of Harmony Patent.

At 303, the computer-based musical composition system decides (i.e., determines) when to transition to a new key by solving a constraint satisfaction problem comprising constraints 311, 312, and 313.

Constraint 311 requires that every segment determined at 301 and clustered at 302 is assigned a key. Each segment may be assigned a respective key, or multiple segments may be assigned a same key, but constraint 311 requires that no segment can be without an assigned key.

Constraint 312 requires that segments in a same cluster at 302 are assigned a same key. For example, in an implementation of method 300 that generates five segments (S1, S2, S3, S4, and S5) at 301, with the segments clustered at 302 as follows: S1 and S2 are grouped into a first cluster X; S3 and S5 are grouped into a second cluster Y; and S4 is grouped into a third cluster Z, then constraint 312 requires that cluster X (and therefore segments S1 and S2) is assigned a first key, cluster Y (and therefore segments S3 and S5) is assigned a second key, and cluster Z (and therefore segment S4) is assigned a third key. Depending on the specific implementation, the first key, the second key, and the third key may all be the same key, the first key, the second key, and the third key may all be different keys, or any pair of the first key, the second key, and the third key may be the same key.

Constraint 313 requires that segments that abut one another in the musical composition are assigned respective keys that conform to an allowed key to key transition with respect to at least one key progression generation model (e.g., Circle of Fifths 100, Coltrane Circle 200, and/or another progression) as described in the "Enabling a Computer-Based Musical Composition System to Decide What Key to Change to" of the present systems, devices, and methods. In some implementations, "conforming to an allowed key to key transition" may require a change in key or may include preserving a same key (i.e., without changing key).

Segments, and in particular abutting segments, that satisfy constraints 311, 312, and 313 may be identified as appropriate locations in a musical composition at which to introduce a key modulation, for example, when generating a musical variation of the musical composition.

In some implementations, an additional analysis may be performed to characterize the tonal quality of the music in each segment as more major or more minor, and such characterization may be used to further guide the choice of which key to assign to which segment. For example, in some implementations the mood of each segment may be characterized and/or labeled in accordance with U.S. patent application Ser. No. 17/163,282, filed Jan. 29, 2021 and entitled "Systems, Devices, and Methods for Assigning Mood Labels to Musical Compositions", which is incorporated by reference herein in its entirety, and such mood information may be used by the computer-based musical composition system to influence which key to assign to each segment or cluster of segments.

In implementations in which not all of the constraints are satisfiable in full, a solution of key assignment to each segment that maximizes the number of constraints satisfied may be accepted. In some implementations, one or more constraints may be weighted to establish a ranking or priority for how the constraints are satisfied.

C) Enabling a Computer-Based Musical Composition System to Decide What Chords to Use while within the New Key Having enabled a computer-based musical composition system to decide: A) what key to change to; and B) when (within the composition) to change key, the present systems, devices, and methods further address what chords (e.g., chord progression) to use while within the new key. More specifically, some implementations enable a computer-based musical composition system to determine what chord progression to use within each region for which the key is temporarily fixed within a composition having modulating (changing) keys.

Within each regime of fixed key (for example, within a bar, within a harmonic, within a segment, or within a cluster of segments), the chords may be fixed (e.g., the same chord throughout the bar, harmonic element, segment, or cluster of segments) or the chords may be permitted to follow a diatonic progression with the (temporarily fixed) key.

In implementations that employ a chord progression that is diatonic with respect to a first key, the present systems, devices, and methods advantageously ensure that the progression terminates in an appropriate pivot chord or leading chord, as described previously, when modulating into a next key. This may help ensure that the chord progression moves aesthetically from a first key to a second key as the key is modulated.

In some implementations, a voicing of a key or chord progression may be tuned by selectively employing particular inversions of chords. Similarly, additional musical nuance and character may be deliberately incorporated by selectively introducing chord substitutions, where a particular chord that is conventionally outside of a given chord progression or even outside of the active key may be used in place of a more conventional chord.

The present systems, devices, and methods are not restricted (as in the Circle of Fifths 100) to only the major and natural minor keys. As described previously, it is possible to exploit a much richer set of harmonic transitions by using pivot chords (and/or, in some implementations, leading chords) between many key pairs beyond the conventional major and natural minor key pairs.

Figure 4:
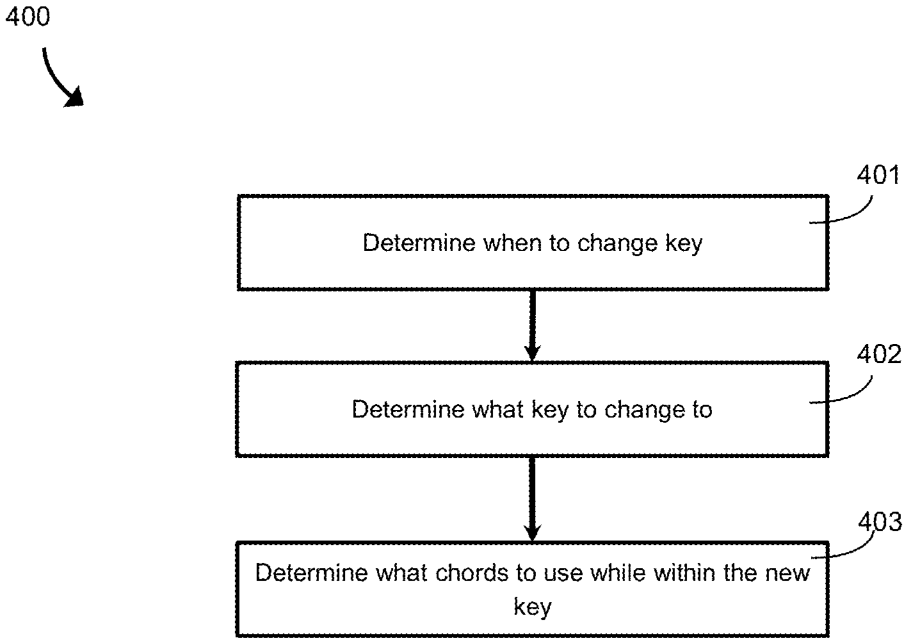
FIG. 4 is a flow diagram showing a computer-implemented method of generating an aesthetic key modulation in accordance with the present systems, devices, and methods.

FIG. 4 is a flow diagram showing a computer-implemented method 400 of generating an aesthetic key modulation in a musical composition in accordance with the present systems, devices, and methods. Method 400 may, in at least some respects, summarize the above teachings and disclosures. Method 400 includes three acts 401, 402, and 403, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 401, a computer-based musical composition system executes processor-executable instructions and/or data stored in a non-transitory processor-readable storage medium that cause the computer-based musical composition system to determine when to change key as described in section B) of the present systems, devices, and methods.

At 402, the computer-based musical composition system executes processor-executable instructions and/or data stored in the non-transitory processor-readable storage medium that cause the computer-based musical composition system to determine what key to change to as described in section A) of the present systems, devices, and methods.

At 403, the computer-based musical composition system executes processor-executable instructions and/or data stored in the non-transitory processor-readable storage medium that cause the computer-based musical composition system to determine what chords to use while within the new key as described in section C) of the present systems, devices, and methods.

Figure 5:
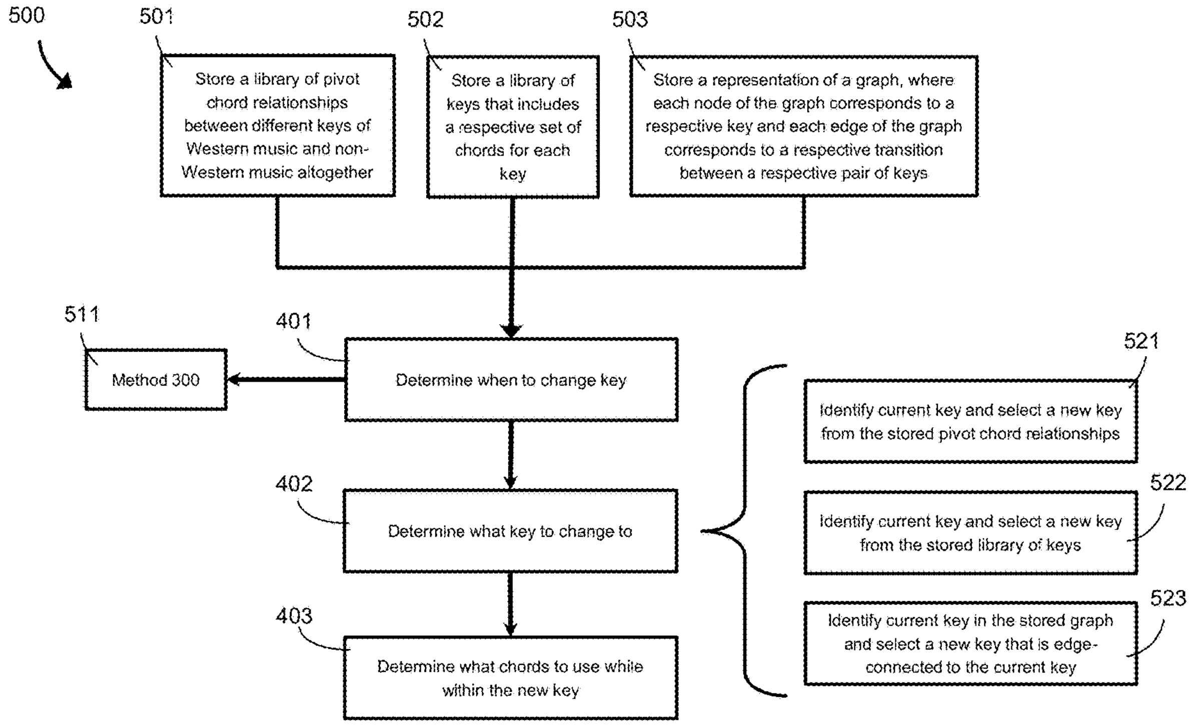
FIG. 5 is a flow diagram showing a computer-implemented method of generating an aesthetic key modulation in a musical composition in accordance with the present systems, devices, and methods.

FIG. 5 is a flow diagram showing a computer-implemented method 500 of generating an aesthetic key modulation in a musical composition in accordance with the present systems, devices, and methods. Method 500 includes acts 401, 402, and 403 from method 400 and adds exemplary details, adaptations, or refinements thereto. Though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Acts 501, 502, and 503 are each optional. In various implementations, any one of acts 501, 502, or 503 may performed or any combination of acts 501, 502, and/or 503 may be performed. The computer-based musical composition system performing method includes, or has access to, a non-transitory processor-readable storage medium and acts 501, 502, and 503 give examples of various data and/or processor-executable instructions that may be stored in such non-transitory processor-readable storage medium in order to enable the computer-based musical composition system to determine what key to change to as described previously. That is, at 501 the non-transitory processor-readable storage medium stores a library of pivot chord relationships between different keys (e.g., of both Western music and non-Western music altogether); at 502 the non-transitory processor-readable storage medium stores a library of keys that includes a respective set of chords for each key; and/or at 503 the non-transitory processor-readable storage medium stores a representation of a graph, where each node of the graph corresponds to a respective key and each edge of the graph corresponds to a respective transition between a respective pair of keys. In some implementations, as an alternative to storing a library of pivot chords at 501, the computer-based musical composition system may store data and/or processor-executable instructions that, when executed by at least one processor of the computer-based musical composition system, cause the computer-based musical composition system to calculate a suitable pivot chord based on, for example, the key, note(s), note sequence(s), note interval(s), and/or chord(s) of the musical composition. Similarly, in some implementations as an alternative to storing a library of keys that includes a respective set of chords for each key at 502, the computer-based musical composition system may store data and/or processor-executable instructions that, when executed by at least one processor of the computer-based musical composition system, cause the computer-based musical composition system to calculate a suitable lead chord based on, for example, the key, note(s), note sequence(s), note interval(s), and/or chord(s) of the musical composition.

At 401, the computer-based musical composition system executes processor-executable instructions and/or data stored in the non-transitory processor-readable storage medium that cause the computer-based musical composition system to determine when to change key as previously described; however, in the specific exemplary implementation of method 500, act 401 includes an implementation of method 300. That is, at 401 of method 500, the computer-based musical composition system determines when to change key by executing data and/or processor-executable instructions that cause the computer-based musical composition system to perform an implementation of method 300 from FIG. 3.

At 402, the computer-based musical composition system executes processor-executable instructions and/or data stored in the non-transitory processor-readable storage medium that cause the computer-based musical composition system to determine what key to change to as previously described; however, in the specific exemplary implementation of method 500, act 401 includes at least one of optional sub-acts 521, 522, and/or 523.

Sub-act 521 may be included, for example, in implementations of method 500 that include act 501. Act 521, the computer-based musical composition system executes processor-executable instructions and/or data, including the library of pivot relationships (or data and/or processor-executable instructions for calculating picot chords) from 501, stored in the non-transitory processor-readable storage medium that cause the computer-based musical composition system to identify the current key of the musical composition (or a portion, bar, segment, or cluster of segments thereof) and select a new key from the stored pivot chord relationships. Depending on the specific implementation, the computer-based musical composition system may identify the current key by analyzing the distribution of notes, note intervals, chords, and/or chord transitions within one or more bars or segments of a musical composition and infer the current key from such analyze, or the computer-based musical composition system may identify the current key simply by virtue of having chosen/implemented/effected the current key if, for example, the computer-based musical composition system has generated, or is in the processor of generating, the musical composition.

Sub-act 522 may be included, for example, in implementations of method 500 that include act 502. Act 522, the computer-based musical composition system executes processor-executable instructions and/or data, including the library of keys (or data and/or instructions for calculating lead chords) from 502, stored in the non-transitory processor-readable storage medium that cause the computer-based musical composition system to identify a current key of the musical composition (or a portion, bar, segment, or cluster of segments thereof) and select a new key from the stored library of keys.

Sub-act 523 may be included, for example, in implementations of method 500 that include act 503. Act 523, the computer-based musical composition system executes processor-executable instructions and/or data, including the representation of a graph encoding keys and relationships (e.g., allowed transitions) therebetween from 503, stored in the non-transitory processor-readable storage medium that cause the computer-based musical composition system to identify a current key in the stored graph (corresponding, e.g., to a portion, bar, segment, or cluster of segments from the musical composition) and select a new key that is edge-connected to the current key.

In some implementations, the systems, devices, and methods for generating key modulations and chord progressions described herein may be deployed by a computer-based musical composition when generating a musical variation of an existing musical composition or when generating a new musical composition based on at least one existing musical composition. For example, an existing musical composition may be analyzed by the computer-based musical composition system, where such analysis may include segmenting the existing musical composition per act 301 of method 300. Once the segmentation is complete, the computer-based musical composition system may leverage or use the resulting segments to generate a new musical composition, where the use of the segments may include performing acts 302 and 303 of method 300 to generate new musical bars in a new musical composition based on the original musical composition.

Throughout this specification and the appended claims, the term "first" and related similar terms, such as "second," "third," and the like, are often used to identify or distinguish one element or object from other elements or objects (as in, for example, "first note" and "first bar"). Unless the specific context requires otherwise, such uses of the term "first," and related similar terms such as "second," "third," and the like, should be construed only as distinguishing identifiers and not construed as indicating any particular order, sequence, chronology, or priority for the corresponding element(s) or object(s). For example, unless the specific context requires otherwise, the term "first note" simply refers to one particular note among other notes and does not necessarily require that such one particular note be positioned ahead of or before any other note in a sequence of notes; thus, a "first note" of a musical composition or bar is one particular note from the musical composition or bar and not necessarily the lead or chronologically-first note of the musical composition or bar.

The various implementations described herein often make reference to "computer-based," "computer-implemented," "at least one processor," "a non-transitory processor-readable storage medium," and similar computer-oriented terms. A person of skill in the art will appreciate that the present systems, devices, and methods may be implemented using or in association with a wide range of different hardware configurations, including localized hardware configurations (e.g., a desktop computer, laptop, smartphone, or similar) and/or distributed hardware configurations that employ hardware resources located remotely relative to one another and communicatively coupled through a network, such as a cellular network or the internet. For the purpose of illustration, exemplary computer systems suitable for implementing the present systems, devices, and methods are provided in FIG. 6.

FIG. 6 is an illustrative diagram of an exemplary computer-based musical composition system 600 suitable at a high level for performing the various computer-implemented methods described in the present systems, devices, and methods. Although not required, some portion of the implementations are described herein in the general context of data, processor-executable instructions or logic, such as program application modules, objects, or macros executed by one or more processors. Those skilled in the art will appreciate that the described implementations, as well as other implementations, can be practiced with various processor-based system configurations, including handheld devices, such as smartphones and tablet computers, multiprocessor systems, microprocessor-based or programmable consumer electronics, personal computers ("PCs"), network PCs, minicomputers, mainframe computers, and the like.

Computer-based musical composition system 600 includes at least one processor 601, a non-transitory processor-readable storage medium or "system memory" 602, and a system bus 610 that communicatively couples various system components including the system memory 602 to the processor(s) 601. Computer-based musical composition system 600 is at times referred to in the singular herein, but this is not intended to limit the implementations to a single system, since in certain implementations there will be more than one system or other networked computing device(s) involved. Non-limiting examples of commercially available processors include, but are not limited to: Core microprocessors from Intel Corporation, U.S.A., PowerPC microprocessor from IBM, ARM processors from a variety of manufacturers, Sparc microprocessors from Sun Microsystems, Inc., PA-RISC series microprocessors from Hewlett-Packard Company, and 68xxx series microprocessors from Motorola Corporation.

The processor(s) 601 of computer-based musical composition system 600 may be any logic processing unit, such as one or more central processing units (CPUs), microprocessors, digital signal processors (DSPs), application-specific integrated circuits (ASICs), field programmable gate arrays (FPGAs), and/or the like. Unless described otherwise, the construction and operation of the various blocks shown in FIG. 6 may be presumed to be of conventional design. As a result, such blocks need not be described in further detail herein as they will be understood by those skilled in the relevant art.

The system bus 610 in the computer-based musical composition system 600 may employ any known bus structures or architectures, including a memory bus with memory controller, a peripheral bus, and/or a local bus. The system memory 602 includes read-only memory ("ROM") 621 and random access memory ("RAM") 622. A basic input/output system ("BIOS") 623, which may or may not form part of the ROM 621, may contain basic routines that help transfer information between elements within computer-based musical composition system 600, such as during start-up. Some implementations may employ separate buses for data, instructions and power.

Computer-based musical composition system 600 (e.g., system memory 602 thereof) may include one or more solid state memories, for instance, a Flash memory or solid state drive (SSD), which provides nonvolatile storage of processor-executable instructions, data structures, program modules and other data for computer-based musical composition system 600. Although not illustrated in FIG. 6, computer-based musical composition system 600 may, in alternative implementations, employ other non-transitory computer- or processor-readable storage media, for example, a hard disk drive, an optical disk drive, or a memory card media drive.

Program modules in computer-based musical composition system 600 may be stored in system memory 602, such as an operating system 624, one or more application programs 625, program data 626, other programs or modules 627, and drivers 628.

The system memory 602 in computer-based musical composition system 600 may also include one or more communications program(s) 629, for example, a server and/or a Web client or browser for permitting computer-based musical composition system 600 to access and exchange data with other systems such as user computing systems, Web sites on the Internet, corporate intranets, or other networks as described below. The communications program(s) 629 in the depicted implementation may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Google (Chrome), Mozilla (Firefox), Apple (Safari), and Microsoft (Internet Explorer).

While shown in FIG. 6 as being stored locally in system memory 602, operating system 624, application programs 625, program data 626, other programs/modules 627, drivers 628, and communication program(s) 629 may be stored and accessed remotely through a communication network or stored on any other of a large variety of non-transitory processor-readable media (e.g., hard disk drive, optical disk drive, SSD and/or flash memory).

Computer-based musical composition system 600 may include one or more interface(s) to enable and provide interactions with a user, peripheral device(s), and/or one or more additional processor-based computer system(s). As an example, computer-based musical composition system 600 includes interface 630 to enable and provide interactions with a user of computer-based musical composition system 600. A user of computer-based musical composition system 600 may enter commands, instructions, data, and/or information via, for example, input devices such as computer mouse 631 and keyboard 632. Other input devices may include a microphone, joystick, touch screen, game pad, tablet, scanner, biometric scanning device, wearable input device, and the like. These and other input devices (i.e., "I/O devices") are communicatively coupled to processor(s) 601 through interface 630, which may include one or more universal serial bus ("USB") interface(s) that communicatively couples user input to the system bus 610, although other interfaces such as a parallel port, a game port or a wireless interface or a serial port may be used. A user of computer-based musical composition system 600 may also receive information output by computer-based musical composition system 600 through interface 630, such as visual information displayed by a display 633 and/or audio information output by one or more speaker(s) 634. Monitor 633 may, in some implementations, include a touch screen.

As another example of an interface, computer-based musical composition system 600 includes network interface 640 to enable computer-based musical composition system 600 to operate in a networked environment using one or more of the logical connections to communicate with one or more remote computers, servers and/or devices (collectively, the "Cloud" 641) via one or more communications channels. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, network interface 640 may include one or more wired or wireless communications interfaces, such as network interface controllers, cellular radios, WI-FI radios, and/or Bluetooth radios for establishing communications with the Cloud 641, for instance, the Internet or a cellular network.

In a networked environment, program modules, application programs or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, processor(s) 601, system memory 602, interface 630, and network interface 640 are illustrated as communicatively coupled to each other via the system bus 610, thereby providing connectivity between the above-described components. In alternative implementations, the above-described components may be communicatively coupled in a different manner than illustrated in FIG. 6. For example, one or more of the above-described components may be directly coupled to other components, or may be coupled to each other via intermediary components (not shown). In some implementations, system bus 610 may be omitted with the components all coupled directly to each other using suitable connections.

In accordance with the present systems, devices, and methods, computer-based musical composition system 600 may be used to implement or in association with any or all of methods 300, 400, and/or 500 described herein and/or to encode, manipulate, vary, and/or generate any or all of the musical compositions described herein. Generally, computer-based musical composition system 600 may be deployed or leveraged to generate aesthetic chord progressions and key modulations as described throughout this specification and the appended claims. Where the descriptions of methods 300, 400, and 500 make reference to an act being performed by at least one processor or more generally by a computer-based musical composition system, such act may be performed by processor(s) 601 and/or system memory 602 of computer system 600.

Computer system 600 is an illustrative example of a system for performing all or portions of the various methods described herein, the system comprising at least one processor 601, at least one non-transitory processor-readable storage medium 602 communicatively coupled to the at least one processor 601 (e.g., by system bus 610), and the various other hardware and software components illustrated in FIG. 6 (e.g., operating system 624, mouse 631, etc.). In particular, in order to enable system 600 to implement the present systems, devices, and methods, system memory 602 stores a computer program product 650 comprising processor-executable instructions and/or data 651 that, when executed by processor(s) 601, cause processor(s) 601 to perform the various acts of methods 300, 400, and/or 500 that are performed by a computer-based musical composition system.

Throughout this specification and the appended claims, the term "computer program product" is used to refer to a package, combination, or collection of software comprising processor-executable instructions and/or data that may be accessed by (e.g., through a network such as cloud 641) or distributed to and installed on (e.g., stored in a local non-transitory processor-readable storage medium such as system memory 602) a computer system (e.g., computer system 600) in order to enable certain functionality (e.g., application(s), program(s), and/or module(s)) to be executed, performed, or carried out by the computer system.

Throughout this specification and the appended claims, reference is often made to musical compositions being "automatically" generated/composed by computer-based algorithms, software, and/or artificial intelligence (AI) techniques. A person of skill in the art will appreciate that a wide range of algorithms and techniques may be employed in computer-generated music, including without limitation: algorithms based on mathematical models (e.g., stochastic processes), algorithms that characterize music as a language with a distinct grammar set and construct compositions within the corresponding grammar rules, algorithms that employ translational models to map a collection of non-musical data into a musical composition, evolutionary methods of musical composition based on genetic algorithms, and/or machine learning-based (or AI-based) algorithms that analyze prior compositions to extract patterns and rules and then apply those patterns and rules in new compositions. These and other algorithms may be advantageously adapted to exploit the features and techniques enabled by the digital representations of music described herein.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A computer-implemented method of operating a computer-based musical composition system to generate a variation of a musical composition, wherein the variation includes a key modulation, the method comprising:

segmenting, by the computer-based musical composition system, the musical composition into segments;

performing, by the computer-based musical composition system, an automated clustering of the segments to group segments that are similar together;

solving, by the computer-based musical composition system, a constraint satisfaction problem that specifies that:

every segment is assigned a key;

segments in a same cluster are assigned a same key; and segments that abut one another are assigned respective keys that conform to an allowed key to key transition with respect to a key progression generation model, wherein at least one pair of abutting segments is assigned a key to key transition that is different from a corresponding key to key transition in the musical composition; and generating a variation of the musical composition that satisfies the constraint satisfaction problem.

2. The method of claim 1 wherein solving, by the computer-based musical composition system, a constraint satisfaction problem that specifies that segments that abut one another are assigned respective keys that conform to an allowed key to key transition with respect to a key progression generation model includes solving, by the computer-based musical composition system, a constraint satisfaction problem that specifies that segments that abut one another are assigned respective keys that are edge-connected in a representation of a graph wherein each node of the graph corresponds to a respective key and each edge of the graph corresponds to a respective transition between a respective pair of keys.

3. The method of claim 1 wherein solving, by the computer-based musical composition system, a constraint satisfaction problem that specifies that segments that abut one another are assigned respective keys that conform to an allowed key to key transition with respect to a key progression generation model includes solving, by the computer-based musical composition system, a constraint satisfaction problem that specifies that segments that abut one another are assigned respective keys that share a pivot chord relationship.

4. The method of claim 1 wherein solving, by the computer-based musical composition system, a constraint satisfaction problem that specifies that segments that abut one another are assigned respective keys that conform to an allowed key to key transition with respect to a key progression generation model includes solving, by the computer-based musical composition system, a constraint satisfaction problem that specifies that segments that abut one another are assigned respective keys that share a common chord.

* * * * *